(12) United States Patent
Nayak et al.

(10) Patent No.: US 11,368,907 B2
(45) Date of Patent: Jun. 21, 2022

(54) ADAPTIVE CONNECTION MANAGEMENT FOR MARGINAL NETWORK CONDITIONS

(71) Applicant: Google LLC, Mountain View, CA (US)

(72) Inventors: Shivank Nayak, Milpitas, CA (US); Siddharth Ray, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/652,665

(22) PCT Filed: Jan. 29, 2019

(86) PCT No.: PCT/US2019/015666
§ 371 (c)(1),
(2) Date: Mar. 31, 2020

(87) PCT Pub. No.: WO2020/159481
PCT Pub. Date: Aug. 6, 2020

(65) Prior Publication Data
US 2020/0383046 A1      Dec. 3, 2020

(51) Int. Cl.
*H04W 48/20*      (2009.01)
*H04W 76/18*      (2018.01)
*H04W 52/02*      (2009.01)

(52) U.S. Cl.
CPC ....... *H04W 48/20* (2013.01); *H04W 52/0216* (2013.01); *H04W 52/0229* (2013.01); *H04W 52/0245* (2013.01); *H04W 76/18* (2018.02)

(58) Field of Classification Search
CPC ......... Y02D 30/70; H04W 36/00–385; H04W 48/20; H04W 76/18; H04W 52/0216; H04W 52/0229; H04W 52/0245
See application file for complete search history.

(56) References Cited

U.S. PATENT DOCUMENTS 6,628,639 B1    9/2003    Ishii
8,014,305 B1    9/2011    Gilbert et al.
(Continued)

FOREIGN PATENT DOCUMENTS

CN    109005568    12/2018
EP     1804532     7/2007
(Continued)

OTHER PUBLICATIONS

"International Search Report and Written Opinion", PCT Application No. PCT/US2019/015666, dated Aug. 12, 2019, 28 pages.
(Continued)

*Primary Examiner* — Robert C Scheibel

(57) ABSTRACT

The present disclosure describes apparatuses and methods directed to adaptive connection management for marginal network conditions. In some aspects, a connection manager (118) of a user equipment device (102) measures one or more signal-related characteristics of a cellular network (104) that include signal strength of a connection (112-116) available through a base station (106-110) of the cellular network. The connection manager (118) can determine, based on the one or more signal-related characteristics, that the connection (112-116) available through the base station (106-110) of the cellular network (104) is marginal or likely unreliable. In response to this determination, the connection manager (118) can alter connection parameters of the user equipment device (102) effective to mitigate effects associated with attempting to connect or use the marginal connection. In some cases, the user equipment device (102) is prevented from acquiring the marginal connection, which reduces signaling overhead or retransmissions effective to conserve power of the user equipment device (102).

17 Claims, 11 Drawing Sheets

(56) References Cited

U.S. PATENT DOCUMENTS

| | | | |
|---|---|---|---|
| 8,494,518 B1* | 7/2013 | Shah | H04W 48/16 455/434 |
| 8,942,771 B1 | 1/2015 | Ho | |
| 8,996,331 B2 | 3/2015 | Anderson et al. | |
| 10,271,298 B1 | 4/2019 | Yang et al. | |
| 11,109,299 B2 | 8/2021 | Telang et al. | |
| 2009/0296652 A1* | 12/2009 | Rudowicz | H04W 48/16 370/331 |
| 2011/0171915 A1 | 7/2011 | Gomes et al. | |
| 2012/0077456 A1 | 3/2012 | Tiwari | |
| 2012/0088498 A1 | 4/2012 | Xiao et al. | |
| 2012/0129564 A1 | 5/2012 | Chanterac | |
| 2013/0076661 A1 | 3/2013 | Reeves et al. | |
| 2013/0316699 A1 | 11/2013 | Jheng et al. | |
| 2014/0086050 A1* | 3/2014 | Swann | H04L 47/25 370/235 |
| 2014/0269655 A1 | 9/2014 | Du et al. | |
| 2014/0355417 A1 | 12/2014 | Kim et al. | |
| 2015/0146627 A1 | 5/2015 | Ananda et al. | |
| 2015/0169016 A1 | 6/2015 | Doshi et al. | |
| 2015/0312847 A1 | 10/2015 | Lehoux | |
| 2016/0073331 A1* | 3/2016 | Balakrishnan | H04L 12/6418 455/456.1 |
| 2016/0302151 A1 | 10/2016 | Jung et al. | |
| 2016/0316512 A1 | 10/2016 | Dandra et al. | |
| 2016/0345246 A1 | 11/2016 | Xing et al. | |
| 2016/0373974 A1 | 12/2016 | Gomes et al. | |
| 2017/0064608 A1 | 3/2017 | Khay-Ibbat et al. | |
| 2017/0078333 A1 | 3/2017 | Tevlin | |
| 2017/0223621 A1 | 8/2017 | Tan et al. | |
| 2017/0238167 A1 | 8/2017 | Zhang et al. | |
| 2017/0367073 A1 | 12/2017 | Murugan et al. | |
| 2017/0367097 A1* | 12/2017 | Sohn | H04W 74/0833 |
| 2018/0007729 A1 | 1/2018 | Koshta et al. | |
| 2018/0049213 A1 | 2/2018 | Gholmieh et al. | |
| 2018/0070250 A1 | 3/2018 | Venkatraman et al. | |
| 2018/0070293 A1 | 3/2018 | Venkatraman et al. | |
| 2018/0101297 A1 | 4/2018 | Yang et al. | |
| 2018/0110010 A1* | 4/2018 | Khawand | H04W 52/0264 |
| 2018/0137329 A1 | 5/2018 | Kim et al. | |
| 2018/0343689 A1 | 11/2018 | Wu et al. | |
| 2018/0368016 A1 | 12/2018 | Lee | |
| 2019/0021064 A1 | 1/2019 | Ryu et al. | |
| 2019/0357116 A1 | 11/2019 | Huang-Fu et al. | |
| 2021/0022176 A1* | 1/2021 | Yang | H04W 74/00 |
| 2021/0185589 A1 | 6/2021 | Telang et al. | |
| 2021/0377843 A1 | 12/2021 | Nayak et al. | |

FOREIGN PATENT DOCUMENTS

| | | |
|---|---|---|
| EP | 3410775 | 12/2018 |
| WO | 2014004210 | 1/2014 |
| WO | 2021118646 | 6/2021 |

OTHER PUBLICATIONS

"Invitation to Pay Additional Fees", PCT Application No. PCT/US2019/015666, dated Jun. 4, 2019, 20 pages.

Jindal, et al., "Quick Wireless Local Area Network Rate Control", Technical Disclosure Commons; Retrieved from https://www.tdcommons.org/dpubs_series/2671, Nov. 13, 2019, 9 pages.

Sammoura, et al., "Fingerprint-Matching Algorithm Using Polar Shapelets", Technical Disclosure Commons; Retrieved from https://www.tdcommons.org/dpubs_series/2471, Sep. 10, 2019, 17 pages.

Shaikh, "Samsung is Patenting a Mobile Phone with Multi-Plane Display", Retrieved from https://damzone.com/blog/samsung-is-patenting-a-mobile-phone-with-multi-plane-display/ accessed Aug. 13, 2019, Apr. 29, 2019, 6 pages.

Thorp, et al., "Classifying and Separating Messages, Alerts, and Notifications", Technical Disclosure Commons; Retrieved from https://www.tdcommons.org/dpubs_series/2559, Oct. 10, 2019, 14 pages.

"International Search Report and Written Opinion", Application No. PCT/US2020/040900, dated Nov. 10, 2020, 46 pages.

"Invitation to Pay Additional Fees", Application No. PCT/US2020/040900, dated Sep. 21, 2020, 28 pages.

"Non-Final Office Action", U.S. Appl. No. 16/712,697, dated Dec. 10, 2020, 7 pages.

"Simplification to CA Band Combination Management", 3GPP TSG-RAN WG4 #88, Gothenburg, Sweden, Aug. 20-24, 2018, 4 pages.

"3GPP TS 24.501 V16.3.0", 3GPP TS 24.501 version 16.3.0, Dec. 2019, 645 pages.

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

"PLMN Selection in LTE (Idle Mode Action)", Techplayon, Apr. 25, 19, 4 pages.

"Third Generation Partnership Project; Technical Specification Group Services and System Aspects; Service requirements for the 5G system; Stage 1", 3GPP TS 22 261 version 16.10 0 Release 16, Dec. 2019, 72 pages.

Aboba, et al., "Extensible Authentication Protocol (EAP)", RFC Editor; Retrieved from https://www.rfc-editor.org/info/rfc3748, Jun. 2004, 67 pages.

Chou, et al., "Utilizing Supported Band Grouping and Display of Partial Search Results to Expedite Manual PLMN Selection Procedure", Technical Disclosure Commons; Retrieved from https://www.tdcommons.org/dpubs_series/2714, Nov. 24, 2019, 10 pages.

Kragten, et al., "Time Deadline for Modem Mitigation Actions in Regards to Thermal Mitigation", Technical Disclosure Commons; Retrieved from https://www.tdcommons.org/dpubs_series/2689, Nov. 14, 2019, 8 pages.

Lin, et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.

Lin, et al., "Public Land Mobile Network Selection During International Roaming", Technical Disclosure Commons; Retrieved from https://www.tdcommons.org/dpubs_series/2562, Oct. 14, 2019, 13 pages.

Son, "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.

"Notice of Allowance", U.S. Appl. No. 16/712,697, dated Apr. 23, 2021, 6 pages.

"Preliminary Report on Patentability", Application No. PCT/US2019/015666, dated Jul. 27, 2021, 20 pages.

* cited by examiner

ADAPTIVE CONNECTION MANAGEMENT FOR MARGINAL NETWORK CONDITIONS

BACKGROUND

The proliferation of wireless communication technology has greatly increased the number of devices that are able to access remote data or other services through wireless networks. For wide-area networks, such as cellular networks, wireless connectivity is provided through multiple base stations distributed throughout a service area. Each base station of the wide area network may serve mobile stations (e.g., cellular phones) located within a respective geographical subsection or cell of the service area. As a mobile station moves relative to the service area, signal strength of a communication link with one of the base stations may decrease as the mobile station moves away from the substation to a low-signal area. In such cases, the communication link of the mobile station can be transferred (e.g., handed off) to another base station, or the communication link may fail while in the low-signal area.

While in this low-signal area, the mobile station typically consumes significantly more power due to increased signaling overhead that is necessary to maintain the communication link with the base station or to find another base station with which to communicate. In some cases, a base-station signal may appear sufficiently strong to enable communication over the wide area network yet is too weak to support meaningful communication of data or voice information. For example, the mobile station may be able to connect with the base station, but the communication link is not stable enough to successfully communicate the data or voice information. In such cases, attempting to maintain or reestablish the communication link can drain significant battery power while the mobile station remains unusable for data-related applications due to the lack of a viable communication link.

In other cases, the mobile station may remain on a communication link with low signal strength due to network-imposed preferences for a particular frequency band. The mobile station may do so until the signal approaches a boundary for triggering reselection to a different frequency band. Similar to operation in a low-signal area, reselection between frequency bands or communication channels entails increased signaling overhead, which results in additional power draw. With varying environmental conditions that can cause signal levels to fluctuate around the reselection boundary, the mobile station may oscillate or ping-pong between different frequency bands, expending additional power and consuming the wide-area network's resources.

SUMMARY

This disclosure describes apparatuses and techniques of adaptive connection management for marginal network conditions. In various aspects, a connection manager of a user equipment device measures signal-related characteristics of a cellular network. The signal-related characteristics may include signal strength of a connection available through a base station of the cellular network. Based on the signal-related characteristics, the connection manager of the user equipment device determines that the connection available through the base station is marginal or likely to be unreliable for data communication. In response to this determination, the connection manager alters connection parameters of the user equipment device effective to mitigate effects associated with attempting to connect with or use the marginal connection of the cellular network. In some aspects, the user equipment device is prevented from acquiring the marginal connection. By so doing, signaling overhead and retransmissions associated with attempting to acquire or use the marginal connection are reduced, which in turn conserves power and resources of the user equipment device.

The details of one or more implementations of adaptive connection management are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

This specification describes apparatuses and techniques of adaptive connection management for marginal network conditions with reference to the following drawings. The same numbers are used throughout the drawings to reference like features and components.

DETAILED DESCRIPTION

Overview

Figure 1:
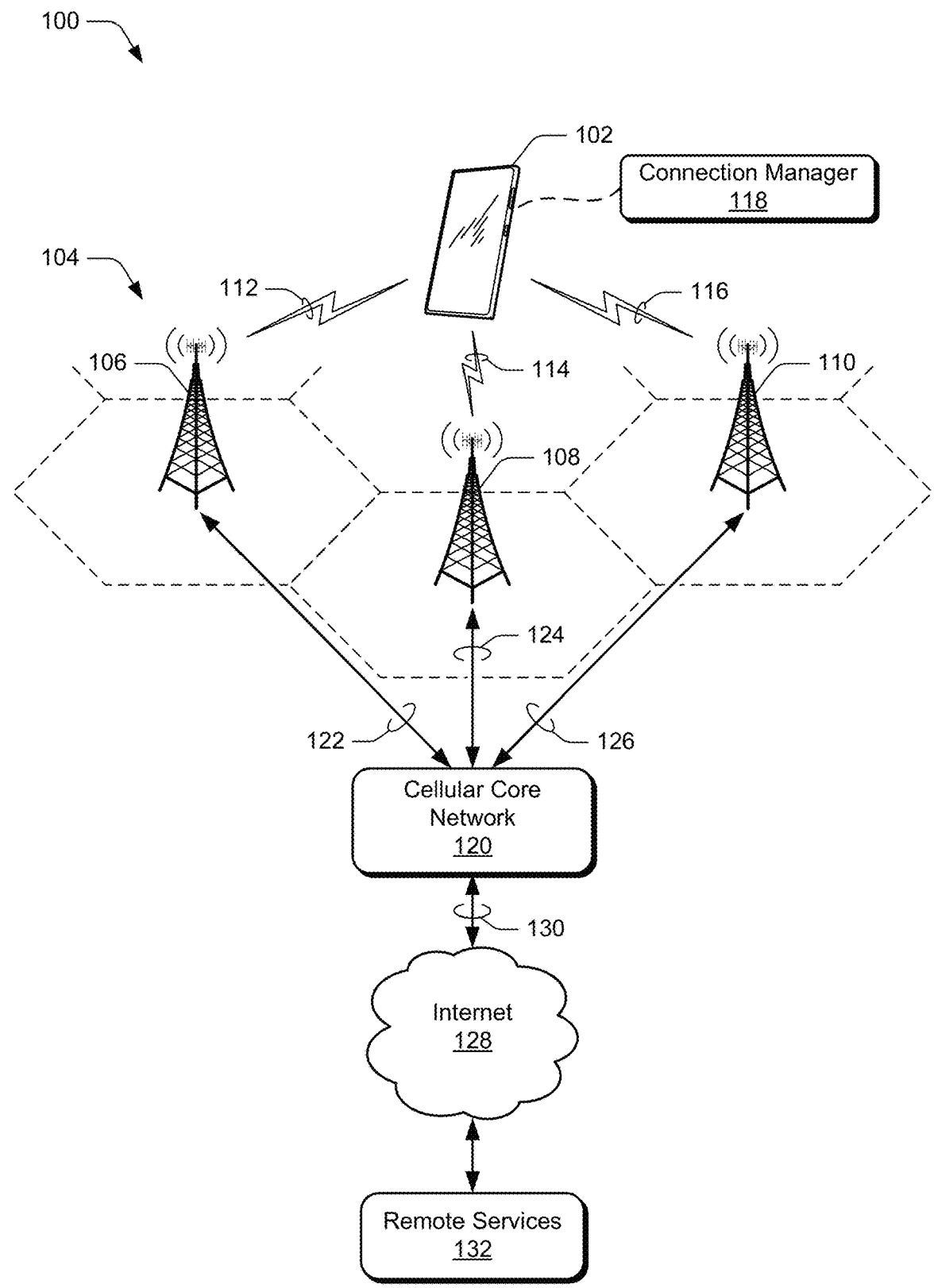
FIG. 1 illustrates an example wireless network environment in which various aspects of adaptive connection management for marginal network conditions can be implemented.

User equipment accesses a cellular network through a communication link or "connection" with a base station of the network. As the user equipment moves throughout a service area of the network or with varying environmental conditions, signal strength of the connection with the access may decrease, sometimes to the point of connection loss. To avoid disruption of service in low-signal areas or due to environmental conditions, the communication link of the user equipment can be transferred (e.g., handed off) to another base station by having the user equipment acquire a connection with the other base station. Alternately, when a connection is lost in a low-signal area, the user equipment may attempt to reacquire a connection with the base station or scan for another base station with stronger signal strength. In some cases, signal strength of a base station may appear sufficient to maintain or re-initiate connection with the cellular network yet is too weak to support meaningful communication of data or voice information. In such cases, continuously attempting to maintain or reestablish a marginal connection with the base station link can drain significant battery power while the user equipment is unusable for data-related applications due to the weak signal strength.

In other cases, the user equipment may remain on a connection with low signal due to network-imposed preferences for a particular frequency band. The user equipment may do so until the signal approaches a boundary for triggering reselection to a different frequency band. Similar to operation in a low-signal area, reselection between frequency bands or communication channels also entails increased signaling overhead that results in additional power draw. With varying environmental conditions that can cause signal levels to fluctuate around the reselection boundary, the user device may oscillate or ping-pong between different frequency bands, expending additional power and consuming resources of the wide area network.

This document describes apparatuses and techniques for adaptive connection management for marginal network conditions. As described, signal strength of a connection available from a base station can vary due to distance, obstructions, or environmental factors. In some scenarios, the signal strength of the connection may appear strong enough to support acquisition or continued use of the connection by a user equipment device (e.g., per network-implemented connection parameters) yet is not viable for communicating data or voice information with a wireless network (e.g., low-signal area or condition). In other words, received signal strength of a marginal connection may meet or exceed network- or carrier-provided signal strength thresholds, but is not strong (e.g., signal strength wise) or consistent enough to support a connection suitable for communicating voice information or data of the user device (e.g., connection appears useable but fails to support meaningful communication of data or information). In such scenarios, the connection with or signal provided by a base station may be referred to as a "marginal", such as a marginal connection, a marginal signal, or more generally, as marginal network conditions. When the user equipment device encounters a low-signal area or marginal network conditions, significantly more power is consumed due to increased signaling overhead associated with attempting to maintain a connection with a base station or find another connection offered by another base station. In various aspects of adaptive connection management for marginal network conditions, connection parameters of a user equipment device are altered to mitigate effects associated with operation in a low-signal area or marginal network conditions. Generally, use of the apparatuses and techniques described herein can result in reduced signaling overhead, data activity, packet retransmission, and/or cell reselection. By so doing, power and processing resources of the user equipment device can be conserved, which may improve device run time and a user experience. Alternately or additionally, improvements in network utilization, network capacity, power savings, or the like may also be provided.

Some aspects described herein include a method implemented by a UE device for adaptive connection management for marginal network conditions. The method includes measuring, at the UE device, one or more signal-related characteristics of a cellular network, the one or more signal-related characteristics including signal strength of a connection available through a base station of the cellular network. The UE device then determines, based on the signal strength, that the connection available through the base station is eligible for acquisition by the user equipment device. Based on the one or more signal-related characteristics, the method also determines that the connection available through the base station of the cellular network is marginal, such that the connection would be unreliable for data transmission. In response to determining that the connection available through the base station is marginal, the method alters connection parameters of the UE device effective to mitigate effects associated with the connection available through the base station that is marginal. Altering the connection parameters of the UE device may include preventing the UE device from acquiring the connection with the base station or limiting data access of the UE device to reduce signaling activity.

Aspects described herein also include a method for a UE device to detect and prevent reselection oscillations by the UE device between one or more marginal network connections. The method includes maintaining, at the UE device, a first connection with a first base station of a cellular network. The UE device monitors one or more signal-related characteristics of a second connection available through a second base station of the cellular network, the one or more signal-related characteristics including signal strength of the second connection. The method then determines, based on the signal strength of the second connection, that the connection available through the second base station is eligible for acquisition by the UE device. Based on the one or more signal-related characteristics, the method also determines that the second connection available through the second base station of the cellular network is marginal. In response to determining that the second connection available through the second base station is marginal, the method alters connection parameters of the UE device effective to prevent the UE device from transitioning from the first connection to the second connection that is marginal. This can be effective to prevent the UE device from attempting to acquire or use the second connection of marginal signal strength, which is likely to result in an increase in signaling overhead, unreliable data communication, and excessing power consumption. By so doing, power and other resources of the UE device can be conserved until a viable network connection is available.

Aspects described herein also include a UE device that includes a transceiver operably coupled with one or more antennas, a hardware-based processor associated with the transceiver, and computer-readable storage media storing instructions that are executable by the hardware-based processor of the UE device. The instructions can be executed to implement a connection manager for cellular networks, which is configured to direct the user equipment device to measure, via the transceiver, one or more signal-related characteristics of a cellular network. The one or more signal-related characteristics include signal strength of a connection available through a base station of the cellular network. Additionally, the one or more signal-related characteristics may include a number of radio link failures, a number of access probes transmitted via the transceiver, or a number of reselections made by the UE device between network connections. The connection manager determines, based on the signal strength, that the connection available through the base station is eligible for acquisition by the user equipment device. Based on the one or more signal-related characteristics, the connection manager also determines that the connection available through the base station of the cellular network is marginal, e.g., likely to be unreliable for data transmission. In response to the connection being marginal, the connection manager alters connection parameters of the user equipment device effective to mitigate effects associated with the marginal connection that is available through the base station of the cellular network.

While any number of different environments, systems, devices, and/or various configurations can implement features and concepts of the described techniques and apparatuses for adaptive connection management for marginal network conditions, aspects of adaptive connection management for marginal network conditions are described in the context of the following example environment, devices, configuration, systems, and methods.

Example Environments

FIG. 1 illustrates an example environment 100 in which various aspects of adaptive connection management for marginal network conditions can be implemented. In the example environment 100, a user equipment device 102 (UE device 102) may communicate with or access network services provided by a wireless network 104. Although illustrated as a smartphone, a UE device 102 may be implemented as any suitable computing or electronic device, such as a mobile communication device, a computing device, a client device, a mobile phone, a tablet computer, a laptop computer, a communication device, an entertainment device, a gaming device, a mobile gaming console, a personal media device, a media playback device, a charging station, an Advanced Driver Assistance System (ADAS), a point-of-sale (POS) transaction system, a health monitoring device, a drone, a camera, a wearable smart-device, a navigation device, a mobile-internet device (MID), an Internet home appliance capable of wireless Internet access and browsing, an Internet-of-Things (IoT) device, a Fifth Generation New Radio (5G NR) user equipment, and/or other types of user devices.

The wireless network 104 may include any suitable type of network including, but not limited to, a wide area network, cellular network, radio access network, or the like. In this example, geographic subsections of a service area of the wireless network 104 are illustrated as cells that include a respective one of base station 106, base station 108, and base station 110. Generally, the UE device 102 accesses the wireless network 104 through a connection or communication link with one of base station 106, base station 108, base station 110, or another base station (not shown) of the wireless network 104. With reference to FIG. 1, the UE device 102 can communicate via the wireless network 104 through a connection 112 with the base station 106, a connection 114 with the base station 108, or with a connection 116 with the base station 110, which may be implemented as any suitable type or combination of wireless links. The connections 112 through 116 (e.g., wireless links) can include a downlink of data and control information communicated from one of the base stations 106 through 110 to the UE device 102, an uplink of other data and control information communicated from the UE device 102 to one of the base stations 106 through 110, or both. In some cases, the UE device 102 can transmit access probes or other queries to the base station on a reverse link or reverse channel to ascertain if a connection is available. Alternately or additionally the connections 112 through 116 may be referred to as communication links, radio links, wireless connections, or the like.

A connection 112, 114, or 116 may also include one or more wireless links or bearers implemented using any suitable communication protocol or standard, or combination of communication protocols or standards, such as a Global System for Mobile Communications (GSM) protocol, a High Speed Packet Access (HSPA) protocol, an Evolved HSPA (HSPA+) protocol, a Long-Term Evolution (LTE) protocol (e.g., 4G), an LTE Advanced protocol, 3rd Generation Partnership Project Long-Term Evolution (3GPP LTE), a Fifth Generation New Radio (5G NR) protocol, a 5GS mobility management (5GMM) protocol, future advanced protocols, Institute of Electrical and Electronics Engineers (IEEE) 802.11 (Wi-Fi™), IEEE 802.16 (Worldwide Interoperability for Microwave Access (WiMax™)), IEEE 802.15 (e.g., Bluetooth™), IEEE 802.15.4 (e.g., Zigbee™), Ultra-Wideband (UWB), and so forth. Multiple wireless links may be aggregated in a carrier aggregation to provide a higher data-rate connection for the UE device 102. Multiple wireless links or connections 112 through 116 from multiple base stations 106 through 110 may also be configured for Coordinated Multipoint (CoMP) communication with the UE device 102.

The UE device 102 includes an adaptive connection manager 118 (connection manager 118) to manage or direct the UE device 102 in utilizing one or more of the connections 112 through 116 for communication with the wireless network 104. Although not shown in FIG. 1, the connection manager 118 may include, be coupled with, or have access to components for measuring characteristics of a connection, scanning for connections, receiving connection parameters from the wireless network 104, acquiring a connection, releasing a connection, or the like. In various aspects of adaptive connection management, the connection manager 118 may also alter connection parameters, such as to reduce data activity associated with a connection or prevent acquisition of a connection. The uses and implementations of the connection manager 118 may vary in accordance with one or more aspects and are described throughout the disclosure.

The base stations 106 through 110 of the wireless network 104 may collectively form a Radio Access Network (RAN), such as an Evolved Universal Terrestrial Radio Access Network (E-UTRAN), Fifth Generation New Radio RAN (5G NR RAN), or the like. As illustrated in FIG. 1, the base stations 106 through 110 of the wireless network 104 or RAN are connected to a cellular core network 120 (core network 120) by respective backhaul links 122 through 126 to form a wireless operator network. The core network 120 may include a 5G core network, an Evolved Packet Core (EPC), or a combination of both. From the core network 120, various data or services of the Internet 128 are made accessible to the UE device 102 via a gateway 130 or edge router (not shown). Alternately or additionally, the UE device 102 can access any other remote services 132 provided by other devices, resources, networks, or service providers that are connected to the Internet 128.

In some network implementations, the base stations 106 through 110 connect, respectively through the backhaul links 122 through 126, to the core network 120 via an NG2 interface for control-plane signaling and via an NG3 interface for user-plane data communications when connecting to 5G core network functions. Alternately or additionally, the base stations 106 through 110 can connect, respectively through the backhaul links 122 through 126, to EPC entities of the core network 120 via an S1 interface for control-plane signaling and user-plane data communications when connecting to EPC core network entities. In addition to connections to core network 120, the base stations 106 through 110 may communicate with each other via wired or wireless data links. For example, the base stations 106 through 110 can communicate with each other via an Xn interface if the base stations are implemented as 5G base stations, or via an X2 interface if the base stations are implemented as E-UTRA base stations.

With reference to FIG. 1, the base stations 106 through 110 are each illustrated as a tower of a cellular network or wireless wide area network (WWAN). One of the base stations 106 through 110, however, may represent or be implemented as another device, radio access node, wireless communication node, or other suitable piece of equipment that facilitates wireless communication (via a wireless link) between user equipment device and a communication network, such as a NodeB base station, a Next Generation Base NodeB (gNB) base station, an Enhanced NodeB (eNB) base station, an evolved NodeB (eNodeB) base station, a Global System for Mobile Communication (GSM) base station, a code-division multiple-access (CDMA) base station, a base transceiver system, a Local Access Network (LAN) router, a Wireless Local Access Network (WLAN) router, a wireless access point (WAP) in a managed (infrastructure) wireless network, a satellite, a terrestrial television broadcast tower, an access point, a peer-to-peer device, another smart phone acting as a base station, and so forth. The base stations 106 through 110 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

Example Devices

Figure 2:
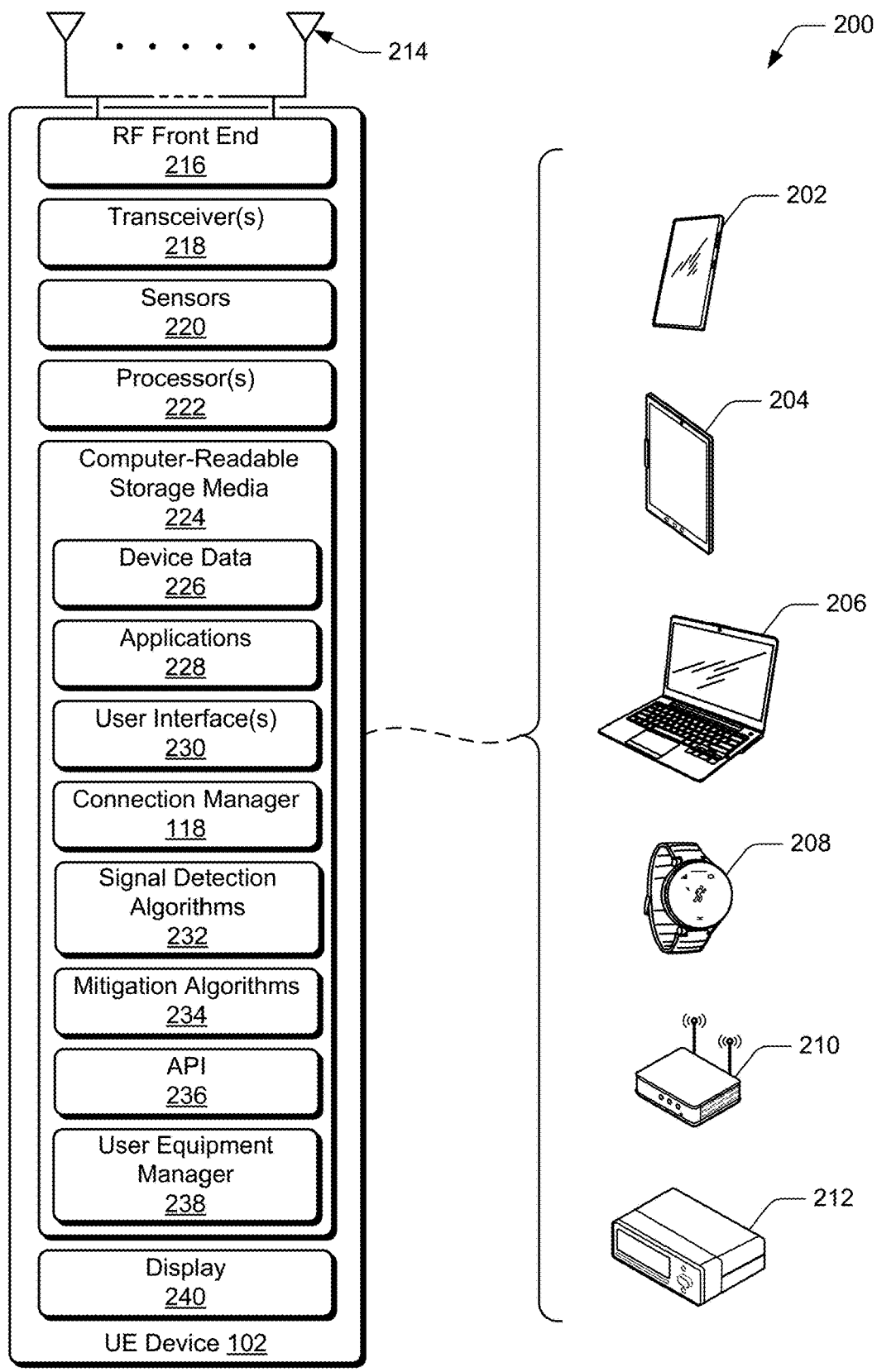
FIG. 2 illustrates an example device diagram of a user equipment device that includes a connection manager in accordance with one or more aspects.

FIG. 2 illustrates an example device diagram 200 of a UE device 102. The UE device 102 may be implemented as any suitable device, some of which are illustrated as a smart phone 202, a tablet computer 204, a laptop computer 206, a wearable computing device 208 (e.g., smart watch), a broadband router 210 (e.g., mobile hotspot), and automotive computing system 212. Although not shown, the UE device 102 may also be implemented as any of a mobile station (e.g., fixed- or mobile-STA), a mobile communication device, a client device, a mobile phone, an entertainment device, a gaming device, a mobile gaming console, a personal media device, a media playback device, an ADAS, a POS transaction system, a health monitoring device, a drone, a camera, a wearable smart-device, a navigation device, a MID, an Internet home appliance capable of wireless Internet access and browsing, an IoT device, a 5G NR user equipment, and/or other types of user devices. The UE device 102 may include additional functions, components, or interfaces omitted from FIG. 2 for the sake of clarity or visual brevity.

In this example, the UE device 102 includes one or more antennas 214, a radio frequency front end 216 (RF front end 216), and at least one transceiver 218 for communicating with base stations 106 through 110 of the wireless network 104, other wireless networks (e.g., WLAN), or other wireless communication-enabled devices. Alternately or additionally, any of the components of the UE device 102 may be implemented in whole or part as hardware logic or circuitry integrated with or separate from other components of the UE device 102.

The transceiver(s) 218 may include one or more of an LTE transceiver, a 5G NR transceiver, other types of transceiver configured to operate on a wide area network or cellular network, and/or another transceiver(s). The RF front end 216 of the UE device 102 can couple or connect the transceiver(s) 218 to the antennas 214 to facilitate various types of wireless communication, such as acquiring and maintaining a connection with one of the base stations 106 through 110 of the wireless network 104. For example, the connectivity manager 118 of the UE device 102 may utilize a connectivity scan to search for network cells (e.g., base stations) of the wireless network 104 that are available for acquisition. The antennas 214 of the UE device 102 may include an array of multiple antennas that are configured similar to or differently from each other. The antennas 214 and the RF front end 216 can be tuned to, and/or be tunable to, one or more frequency bands defined by wireless communication standards and implemented by the transceiver(s) 218 of the UE device 102.

The UE device 102 may also include one or more sensors 220, which enable the UE device 102 to sense various properties, variances, stimuli, or characteristics of an environment in which UE device 102 operates. For example, the sensors 220 may include various motion sensors, ambient light sensors, acoustic sensors, capacitive sensors, infrared sensors, temperature sensors, or magnetic sensors. Alternately or additionally, the sensors 220 may enable interaction with, or receive input from, a user of UE device 102, such as through touch sensing or proximity sensing. In some aspects of adaptive connection management for marginal connections, the UE device 102 or connection manager 118 can monitor a sensor 220, such as to receive input or feedback via one of the sensors 220. Data provided by the sensors 220 is accessible to other entities of the UE device 102, such as the connection manager 118. Although not shown, the sensors 220 may also include global-positioning system (GPS) modules, gyros, accelerometers, magnetometers, micro-electromechanical systems (MEMS), internal/external device temperature sensors, resistive touch sensors, or input sensing-logic associated with hardware switches (e.g., keyboards, snap-domes, or dial-pads), and so on.

In some aspects, the connection manager 118 can determine a motion state of the UE device 102, such as a stationary state of no movement or a mobility state in which the UE device is moving. For example, an accelerometer or gyroscope can sense movement or orientation of the UE device 102 in any suitable aspect, such as in one-dimension, two-dimensions, three-dimensions, multi-axis, combined multi-axis, and the like. Alternately or additionally, a positional sensor, such as a GPS, may indicate a distance traveled, rate of travel, or an absolute or relative position of the UE device 102. Capacitive or proximity sensors may indicate that a position of the UE device 102 is static or changing with respect to a user (e.g., holding or reorienting the UE device). Further, other environmental sensors may indicate an internal or external temperature of the UE device 102, as well as humidity. As such, the connection manager 118 may access data from the sensors 220 and alter, based on the sensor data (e.g., motion, orientation, temperature, proximity), connection parameters of the UE device 102 in accordance with one or more aspects of adaptive connection management.

The UE device 102 also includes processor(s) 222 and computer-readable storage media 224 (CRM 224). The processor(s) 222 may be a single core processor or a multiple core processor composed of a variety of materials, such as silicon, polysilicon, high-K dielectric, copper, and so on. The computer-readable storage media 224 is configured as storage, and thus does not include transitory signals or carrier waves. The CRM 224 may include any suitable memory or storage device such as random-access memory (RAM), static RAM (SRAM), dynamic RAM (DRAM), non-volatile RAM (NVRAM), read-only memory (ROM), or Flash memory useable to store device data 226 of the UE device 102.

The device data 226 may include user data, multimedia data, beamforming codebooks, applications 228, user interface(s) 230, and/or an operating system of the UE device 102, which are executable by processor(s) 222 to enable user-plane communication, control-plane signaling, and user interaction with the UE device 102. The user interface 230 can be configured to receive inputs from a user of the UE device 102, such as to receive input from a user that may define and/or facilitate one or more aspects of adaptive connection management. The user interface 230 can include a graphical user interface (GUI) that receives the input information via a touch input. In other instances, the user interface 230 includes an intelligent assistant that receives the input information via an audible input. Alternately or additionally, the operating system of the UE device 102 may be maintained as firmware or an application on the CRM 224 and executed by the processor(s) 222.

The CRM 224 also includes a connection manager 118, marginal signal detection algorithms 232 (signal detection algorithms 232), and marginal signal mitigation algorithms 234 (mitigation algorithms 234). In various aspects, the connection manager 118 utilizes the signal detection algorithms 232 to detect or determine that a connection available from a network cell or a base station of the network cell is marginal. In response to determining that the connection is marginal, the connection manager 118 can utilize the mitigation algorithms to mitigate effects associated with attempting to acquire or use the marginal signal connection. The implementations and uses of the connection manager 118 vary and are described throughout the disclosure.

Generally, the signal detection algorithms 232 enable the UE device 102 to detect a scenario of marginal network conditions for a connection, such as low signal strength, multiple radio link failures (RFLs), or multiple access probe exits on a particular channel. In some cases, the network conditions or signal-related characteristics include a signal strength characteristic, a non-signal strength characteristic (e.g., RFL or access probe), or a UE device-related and/or UE connection-related characteristic (e.g., link status, previous link status, or the like). For example, a connection may be considered marginal if signal strength of the connection meets a network-specified minimum for acquisition, yet any of the afore-mentioned measurements or indictors fail to meet respective criteria for adaptive connection management. The signal detection algorithms 232 may specify a set of signal-related characteristics for measurement or monitoring, along with a corresponding set of respective thresholds or limits. In some cases, these thresholds or limits associated with adaptive connection management are different or offset from parameters provided by the wireless network, such as default or preconfigured connection parameters provided to UE devices of the wireless network. In at least some aspects, the connection manager 118 sets or configures a threshold for signal strength, number of RFLs, or access probe exits based on environmental factors observed or measured at the UE device 102.

In some aspects, the signal detection algorithms 232 include a threshold of signal strength for determining if a connection or signal of a base station or network cell is marginal. This threshold may be determined by applying an offset to a default or typical minimum signal strength for acquiring a connection, such as a minimum acquisition threshold provided by a management entity of a wireless network. In other words, the connection manager 118 may determine and/or apply an offset to a signal strength connection parameter provided by a base station, network cell, or cellular network administrator. By so doing, the UE device 102 may adaptively determine when network conditions of a connection are marginal based on a signal strength threshold that is different from a statically assigned minimum connection threshold. Alternately or additionally, the signal strength threshold can be determined or set based on environmental factors at the UE device 102 or respective propagation properties of a particular frequency band and access technology (e.g., LTE or 5G). For example, the threshold for marginal signal strength can be determined based on a current external temperature, internal temperature (e.g., of the UE device), humidity, UE device orientation, UE device mobility state, active antenna(s), blocked antenna(s), or the like.

The signal detection algorithms 232 can also be directed to radio link failures (RFL) associated with a connection, network cell, or access point of the network cell. For example, a signal detection algorithm 232 can monitor a number of RFLs for a connection and compare the number of the RFLs with a threshold or limit (e.g., a default value of 3 RFLs). As described, the connection manager 118 may set or adjust the RFL threshold based on environmental characteristics of the UE device, such as movement, orientation, temperature, or the like. In some cases, the number of RFLs are monitored over a duration of time or the RFL count is reset at a predefined interval of time. Alternately or additionally, the signal detection algorithm 232 may include a threshold for signal strength variation at or when an RFL occurs, such that the signal strength variation is not more than 3 dBm between two or more of the RFLs (e.g., other RFLs may be disregarded or the RFL count may be reset).

The signal detection algorithms 232 may also be directed to signal strength associated with random access of a connection. For example, a separate signal strength threshold may be defined for random access communication and/or random access failures. In some cases, the signal strength threshold for random access activity is set or configured based on an offset from a baseline threshold, such as the minimum signal strength threshold of the wireless network. Alternately or additionally, the signal strength threshold associated with random access may be different from and lower than the threshold for marginal signal strength. Thus, in some aspects, the signal detection algorithms 232 include a first threshold for evaluating signal strength of a connection and a second threshold for evaluating signal strength associated with random access of the connection or network cell. For example, a signal or connection may be determined to be marginal when a strength of the signal or connection meets or exceeds a first threshold (e.g., a default signal strength threshold or network assigned signal threshold) yet fails to meet or exceed a second threshold (e.g., a threshold for marginal signal strength or threshold set by the connection manager). To establish the first threshold and second threshold, the signal detection algorithms 232 can include two respective offsets, with the offset for the random access threshold being greater than the offset for the signal strength (or signal power). By way of example, consider table 1 in which respective thresholds are configured for various bands of access an LTE access technology.

TABLE 1

Adaptive Marginal Signal Detection Thresholds

| LTE | Network-Provided Connection Threshold | Threshold for Marginal Signal Strength | Threshold for Marginal Random Access |
| --- | --- | --- | --- |
| Band 2 | −128 dBm | −125 dBm | −120 dBm |
| Band 4 | −128 dBm | −125 dBm | −120 dBm |
| Band 5 | −128 dBm | −125 dBm | −120 dBm |
| Band 12 | −125 dBm | −122 dBm | −117 dBm |
| Band 13 | −125 dBm | −122 dBm | −117 dBm |

In some aspects, a signal detection algorithm 232 or connection manager 118 counts a number of access probes transmitted to a base station through which a connection is available. The connection manager 118 may also monitor a number of times an access probe sequence is attempted by the user device 102. Generally, the access probes are transmitted via a reverse access channel at increasing signal power until a base station or network cell responds to confirm reception. Typically, a maximum of 16 access probes are transmitted as part of a sequence, with a maximum of 15 sequences being transmitted by the UE device 102. The number of access probes or access probe sequences (e.g., unsuccessful sequences) can be compared to an access probe transmission threshold to determine whether the connection available through the base station or network cell is marginal.

The signal detection algorithms 232 may also be useful to detect an oscillation of network reselection or inter-frequency "ping-pong" associated with marginal network conditions. The reselection oscillation may occur when the UE device 102 is stationary or has ceased movement. In some cases, a connection having strong signal strength or good signal quality is available but not in a preferred or high priority frequency band (e.g., a low or lower priority rank in frequency band preference) of the UE device 102. Another connection, in a preferred or high priority frequency band (e.g., a high or higher priority rank in frequency band preference), is also available with marginal signal strength or marginal signal quality, causing the UE device 102 to reselect between the two connections due to frequency band preference or priority. The signal detection algorithms 232 may enable detection of the reselection oscillation when the UE device 102 transitions between the two connections a particular number of times over an interval of time. For example, a resection oscillation may be detected when the UE device 102 transitions between the two connections more than once in a five-minute period. Alternately or additionally, a reselection oscillation may be detected when a UE device 102 oscillates or "ping-pongs" between two connections of marginal signal strength. Typically, the UE device 102, without adaptive connection management, will repeatedly switch between the two marginal connections when one connection appears slightly better than the other connection. Once detected, preventing reselection oscillation or "ping-ponging" between network cells can reduce signaling overhead and conserve power of the UE device. In some aspects, a signal or connection is determined or characterized based on signal-related characteristics that are a non-signal strength characteristic, such as a number of radio link failures, a number of probe access failures, network selection oscillation, or the like.

The connection manager 118 may measure any suitable connection performance data or metric and/or compare this data or metric to a threshold (or criteria) to implement aspects of adaptive connection management. In some cases, performance data or metric includes one of a signal strength characteristic (e.g., measure signal strength), a non-signal strength characteristic (e.g., RFLs or access probe transmissions), or a UE device-related and/or UE connection-related characteristic (e.g., link status, previous link status, or the like). In at least some aspect, the connection performance data or metrics include signal strength, radio link failures, access probe activity, network cell reselection(s), relative frequency band prioritization, or the like. For example, the connection manager may measure or acquire signal- or connection-related information including one or more of connection data (e.g., received signal strength indicator (RSSI) signals, a bit-error rate, a packet-error rate, data-rate information (bandwidth information), latency information, end-to-end throughput, connection duration information, average connection length, signal quality information), network or cell identity information, or data relating to the disconnects, loss of connectivity, a reason for the disconnect, a reason for the loss of connectivity, or information regarding a base station or network cell. Alternately or additionally, the respective threshold or criteria for any of these metrics may be configured by the connection manager 118 based on environmental conditions of the UE device.

Generally, the mitigation algorithms 234 enable the UE device 102 to mitigate effects associated with attempting to acquire or use a marginal connection. The mitigation algorithms 234 may be implemented in response to determining that the UE device 102 is subject to marginal network conditions or determining that a connection available for acquisition or use is marginal. In some cases, the mitigation algorithms 234 include disabling or reducing data access at the UE device 102, such as background data activity. This can be effective to reduce signaling by the UE device 102 in marginal network conditions and/or when the device is not actively being used to access data.

In some aspects, the mitigation algorithms 234 include channel avoidance or connection avoidance that are effective to prevent the UE device 102 from acquiring or using the marginal connection or network cell. An avoidance timer may be used to prevent or bar the UE device 102 from acquiring a marginal connection for a predefined amount of time. In some cases, a duration of the avoidance timer of the mitigation algorithms 234 is altered based on a mobility state of the UE device 102, a subsequent signal strength measurement, a number of previous iterations of the avoidance timer, or the like.

For example, a duration of the avoidance timer can be increased with each successive iteration for a particular connection, frequency band, or channel. When a transition from a stationary state to a mobile state of the UE device 102 is detected, the duration of the avoidance timer can be reduced, such as to aid in reacquisition of a connection if network conditions have improved. Alternately or additionally, on detection of a mobile state to a stationary state, the duration of the avoidance timer can be increased or restored to a default value. In some cases, the avoidance timer is reset if, on a change in mobility state, signal strength of the connection has not improved (e.g., by at least 5 dBm).

When the avoidance timer expires, a connection with a network cell may be acquired on the condition that the signal strength or signal quality has improved by a predefined level (e.g., 3-5 dBm). This predefined level of connection improvement can be set independently for each connection, frequency band, or channel, such as based on propagation properties of the signal at a particular frequency or type of access technology. In cases in which signal strength does not improve after expiration of the avoidance timer, the default or previous duration of the avoidance timer can be increased to avoid the connection for a longer duration of time, thereby conserving additional power at the UE device 102.

In situations where another network cell is available for connection, the connection manager 118 may place or force the UE device into an out-of-service state while the avoidance timer is active. While in the out-of-service state, the connection manager 118 may also reduce or back off a frequency at which the UE device 102 scans for available networks. By so doing, receiver activity of the UE device 102 can be reduced to conserve additional power.

In aspects of adaptive connection management, the connection manager 118, signal detection algorithms 232, and/or mitigation algorithms 234 can be implemented with machine learning or a machine-learned model that is trained to receive input data of one or more types (e.g., network- or signal-related characteristics) and, in response, provide output data of one or more types (e.g., adaptive marginal network thresholds or avoidance timer parameters). For example, any of the thresholds used or determined by the connection manager 118 can be derived from machine learning algorithms with data collected by the UE device 102 while in the field or environment of use.

In some implementations, the input data can include one or more features that are associated with an instance of a UE device 102, such as a current external temperature, internal temperature (e.g., of the UE device), humidity, UE device orientation, UE device mobility state, active antenna(s), blocked antenna(s), or the like. In some implementations, the one or more features associated with the instance or example can be organized into a feature vector. In some implementations, the output data can include one or more predictions or inferences. Thus, given features associated with a particular instance of the UE device 102 or connection manager 118, a machine-learned model can output a prediction or adjustment for such instance based on the features, which may include adaptive marginal network thresholds, detection algorithm parameters, mitigation algorithm parameters, or the like.

By way of example, the machine-learned model can be or include one or more of various different types of machine-learned models. In particular, in some implementations, the machine-learned model can perform classification, regression, clustering, anomaly detection, recommendation generation, and/or other tasks. In some implementations, the machine-learned model can provide output data in the form of one or more recommendations, adjustments, or alterations. In some cases, the machine-learned model is included in or embodied on the connection manager 118, signal detection algorithms 232, and/or mitigation algorithms 234 of a UE device 102. As an example, given input data that describes previous outcomes for certain entities (e.g., a score, ranking, signal strength, or rating indicative network connection quality), the machine-learned model can output a suggestion or recommendation of one or more additional entities or parameters that, based on the previous outcomes, are expected to have a desired outcome (e.g., connection with a non-marginal network connection). As one example, given input data descriptive of a signal strength or number of radio link failures, an adaptive network connection manager can output a suggestion or recommendation for adjusting signal strength thresholds or avoidance timer duration for improved user experience or network connectivity in an area of marginal network conditions.

Aspects and functionalities of the UE device 102 may be operated via operating system controls presented through at least one application programming interface 236 (API 236). In some aspects, the connection manager 118 or an application of the UE device 102 accesses an API 236 or an API service of the UE device 102 to control aspects and functionalities of the user equipment device or transceivers 218. For example, the connection manager 118 could access low-level network enable/connection settings of the UE device 102 to implement aspects of adaptive connection management, such as to disable background data activity, background data access, prevent acquisition of a network cell, delay acquisition of a network cell, or the like.

The CRM 224 of the UE device 102 may also include a user equipment manager 238, which can be implemented in whole or part as hardware logic or circuitry integrated with or separate from other components of the UE device 102. In at least some aspects, the user equipment manager 238 configures the RF front end 216 and/or the transceiver(s) 218 to implement the techniques for selecting a wireless network connection to connect to described herein.

The UE device 102 also includes a display 240 for displaying and/or providing information to a user. For example, through the display 240, the UE device 102 may provide the user with information regarding available network cells, a connection status of the UE device 102 (e.g., out-of-service), an indication of a connection avoidance timer, an indication that background data is disabled, or the like. Based on such information, a user may choose, through the user interface 230, to disable an avoidance timer, re-enable background data, or adjust thresholds and/or offsets by which a connection is determined as marginal.

Figure 3:
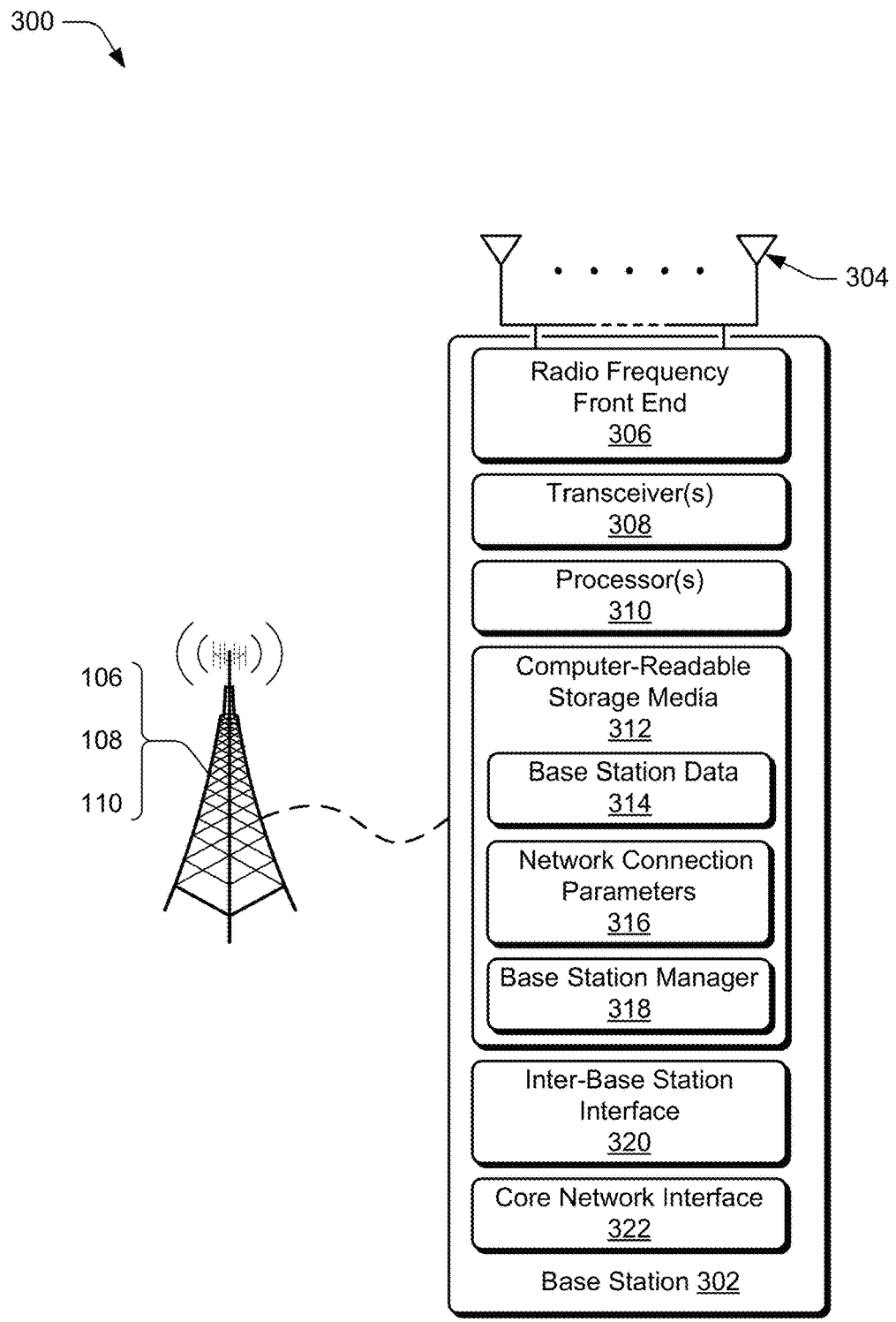
FIG. 3 illustrates an example device diagram of a base station device of a wireless network that is capable of providing network connections in accordance with one or more aspects.

FIG. 3 illustrates an example device diagram 300 of a base station 302, which may represent or correspond to one of a base station 106, a base station 108, or a base station 110 as described with reference to FIG. 1. The base station 302 of the example device diagram 300 may include additional functions, components, and/or interfaces that are omitted from FIG. 3 for the sake of clarity or visual brevity. In the device diagram 300, the base station 302 is generally illustrated as a single network node (e.g., a gNode B). The functionality of the base station 302 and/or base stations 106 through 110 may be distributed across multiple network nodes or devices and may be distributed in any fashion suitable to perform the functions described herein.

The base station 302 includes antennas 304, a radio frequency front end 306 (RF front end 306), and one or more transceivers 308 for communicating with or providing connections for the UE device 102. The RF front end 306 of the base station 302 can couple or connect the transceiver(s) 308 to the antennas 304 to facilitate various types of wireless communication. The antennas 304 of the base station 302 may include an array of multiple antennas that are configured similar to or differently from each other. The antennas 304 and the RF front end 306 can be tuned to, and/or be tunable to, one or more frequency band defined by communication standards and implemented by the transceiver(s) 308.

The base station 302 also includes processor(s) 310 and computer-readable storage media 312 (CRM 312). The processor(s) 310 may be a single core processor or a multiple core processor composed of a variety of materials, such as silicon, polysilicon, high-K dielectric, copper, and so on. The CRM 312 may include any suitable memory or storage device such as random-access memory (RAM), static RAM (SRAM), dynamic RAM (DRAM), non-volatile RAM (NVRAM), read-only memory (ROM), or Flash memory useable to store base station data 314 of the base station 302. The base station data 314 may include network scheduling data, radio resource management data, beamforming codebooks, applications, and/or an operating system of the base station 302, which are executable by processor(s) 310 to enable communication with the UE device 102.

The CRM 312 also includes network connection parameters 316 and a base station manager 318. In some aspects, the network connection parameters 316 are predefined or configured by a wireless network provider to specify or indicate one or more parameters or thresholds useful by user equipment to acquire a connection with a network cell or base station of a wireless network. For example, the network connection parameters may specify, for one or more network cells (e.g., base stations), available frequency bands, frequency band priority, minimum signal strength for network cell connection, minimum bit- or packet-error rates for maintaining a connection, or the like. As described herein, the UE device 102 may receive network connection parameters 316 from the base station 302 or alter the network connection parameters 316 in accordance with one or more aspects. Alternately or additionally, the UE device 102 may be preconfigured with network connection parameters 316 or receive the network connection parameters 316 via a different data interface, such as a WLAN or a wireless personal area network (WPAN).

In at least some aspects, the base station manager 318 configures the transceivers 308 for communication with the UE device 102 or for communication with a core network. The base station 302 includes an inter-base station interface 320, such as an Xn and/or X2 interface, which the base station manager 318 configures to exchange user-plane and control-plane data between another base station (e.g., base station 106, 108, or 110), and to manage the connection of the base station 302 with the UE device 102. The base station 302 also includes a core network interface 322 that the base station manager 318 can configure to exchange user-plane and control-plane data with core network 120, core network functions, or other core-linked entities. This core network interface 322 may include interfaces such as the NG2 interface and the NG3 interface, as described herein with reference to FIG. 1. Alternately or additionally, the components of the base station 302, such as the base station manager 318, may be implemented in whole or part as hardware logic or circuitry integrated with or separate from other components of the base station 302.

Systems

Figure 4:
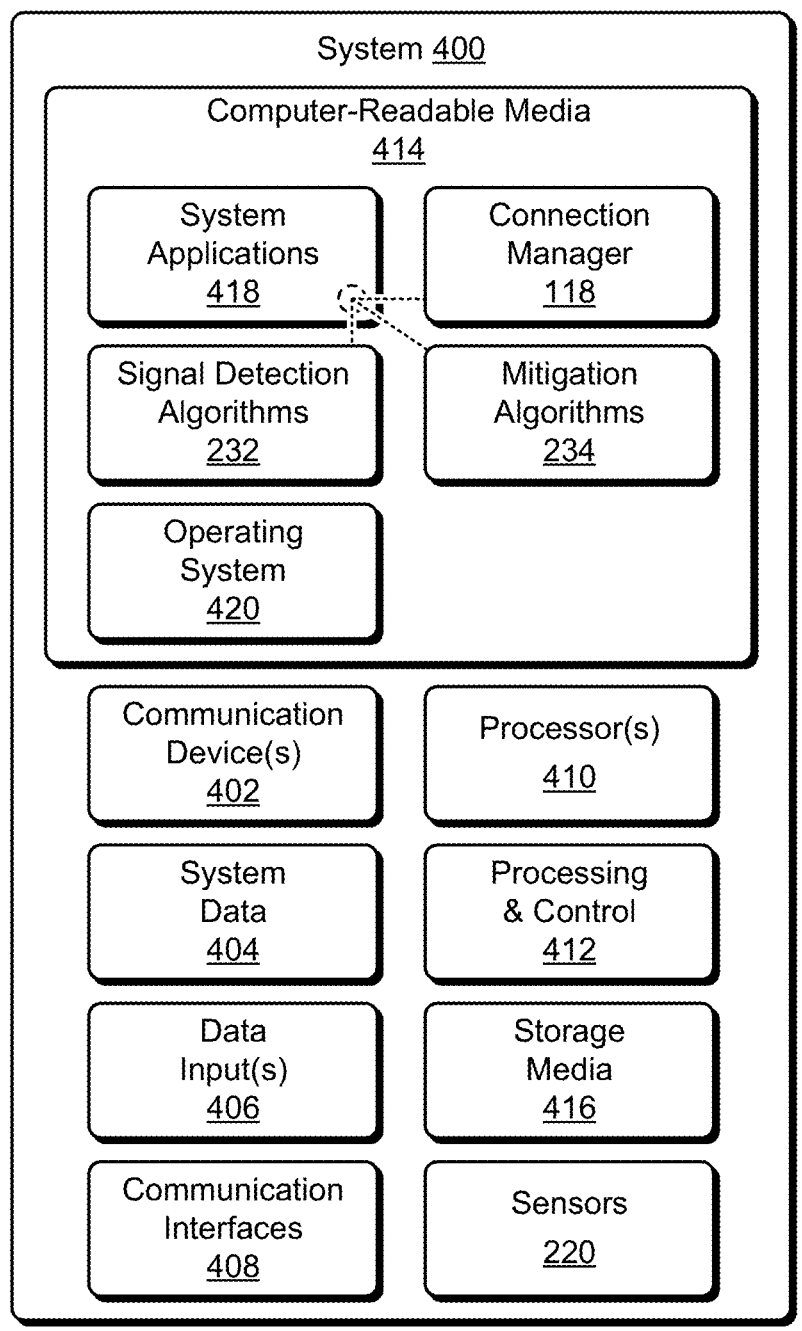
FIG. 4 illustrates an example system diagram of components for implementing adaptive connection management for marginal network conditions in accordance with one or more aspects.
Figure 5:
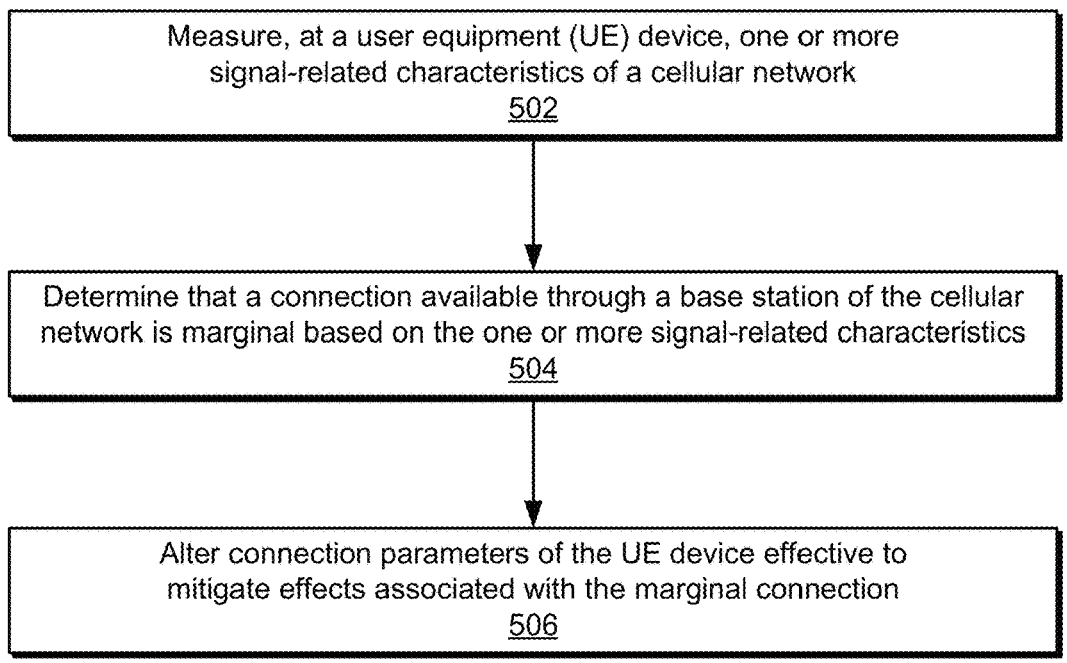
FIG. 5 illustrates an example method for altering connection parameters of a user equipment device to mitigate effects associated with a marginal network connection.
Figure 6:
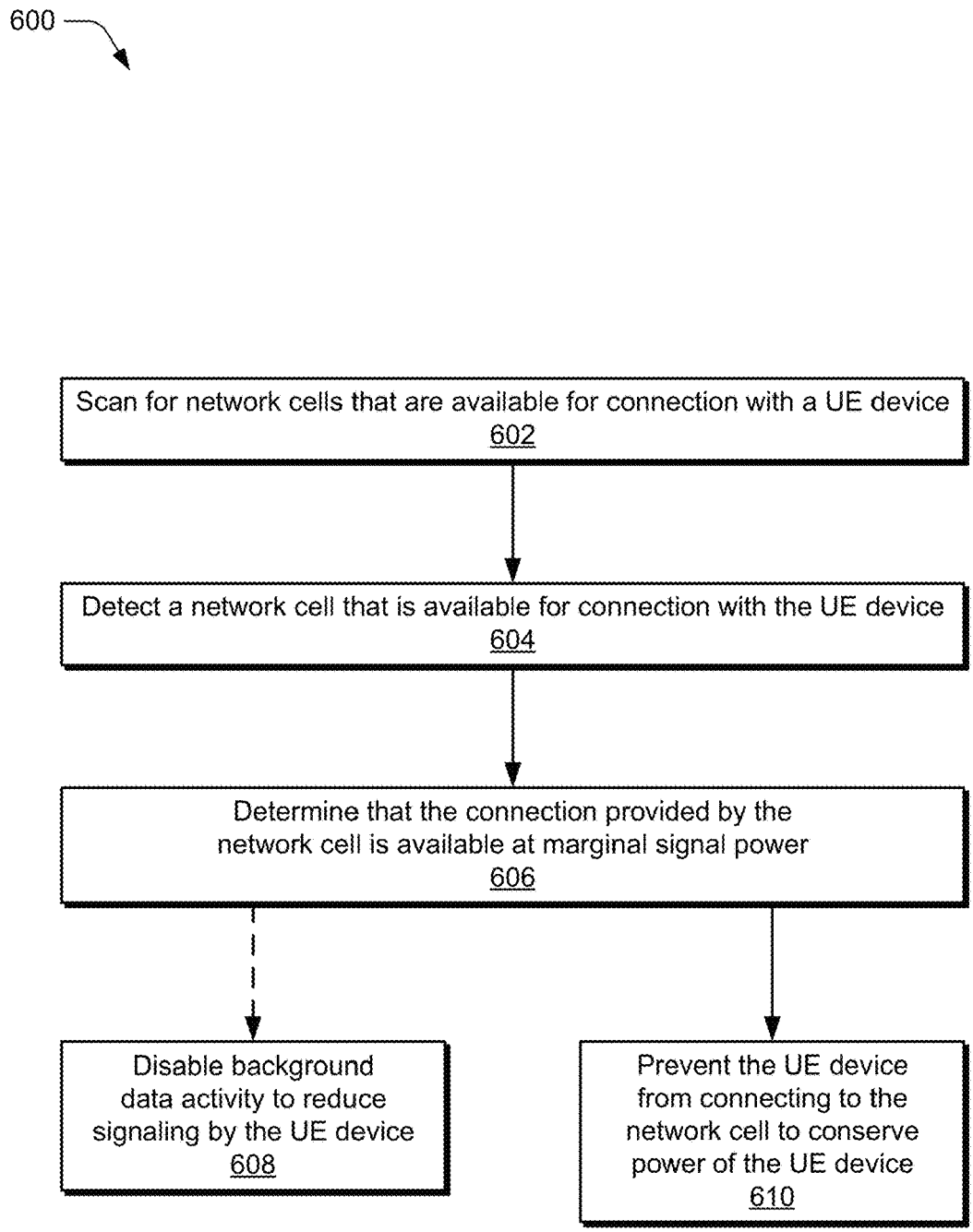
FIG. 6 illustrates an example method for preventing a user equipment device from connecting to a network cell that is available with marginal signal power.
Figure 7:
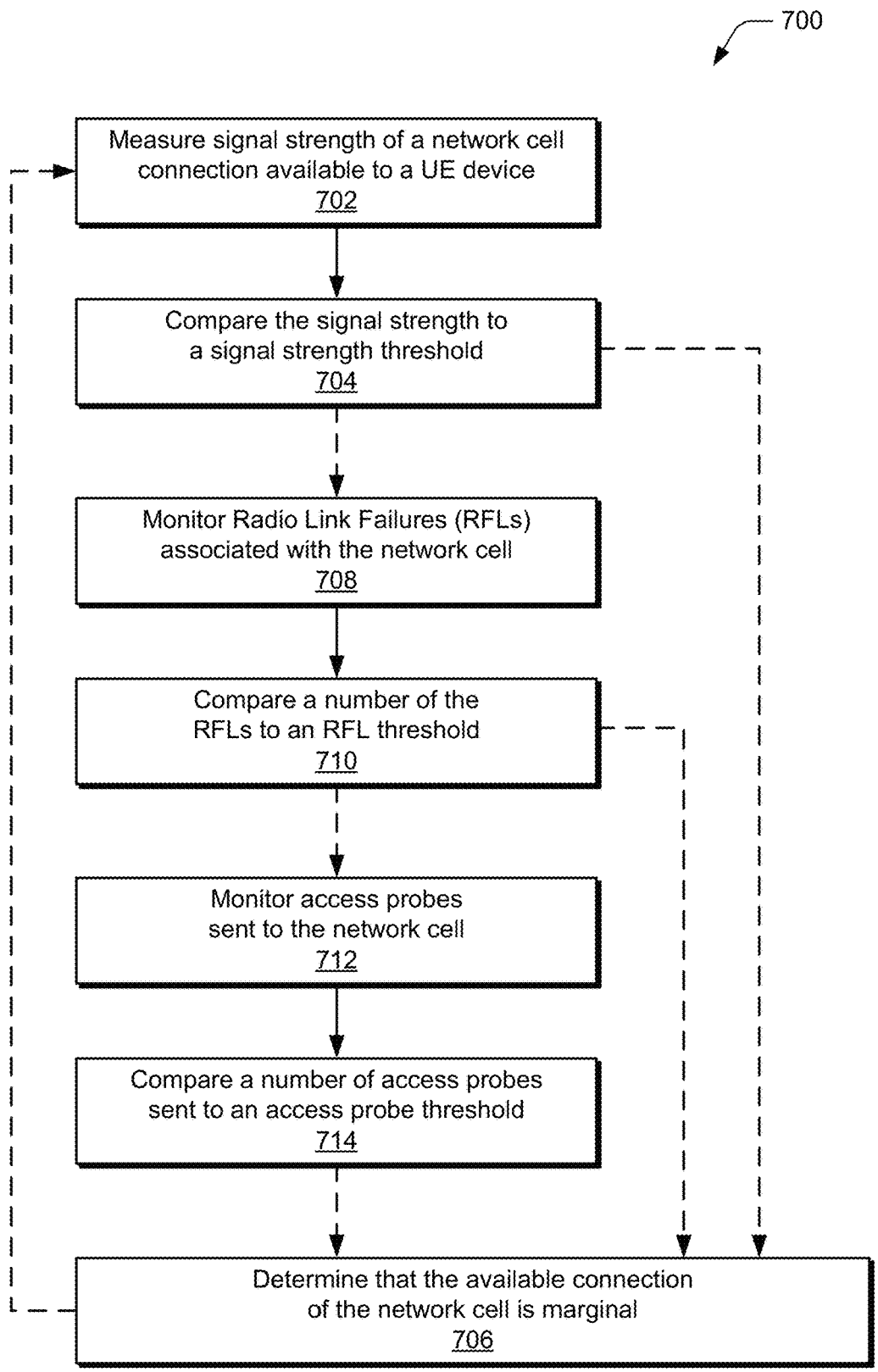
FIG. 7 illustrates an example method of determining that an available connection of a network cell is of marginal signal quality.
Figure 8:
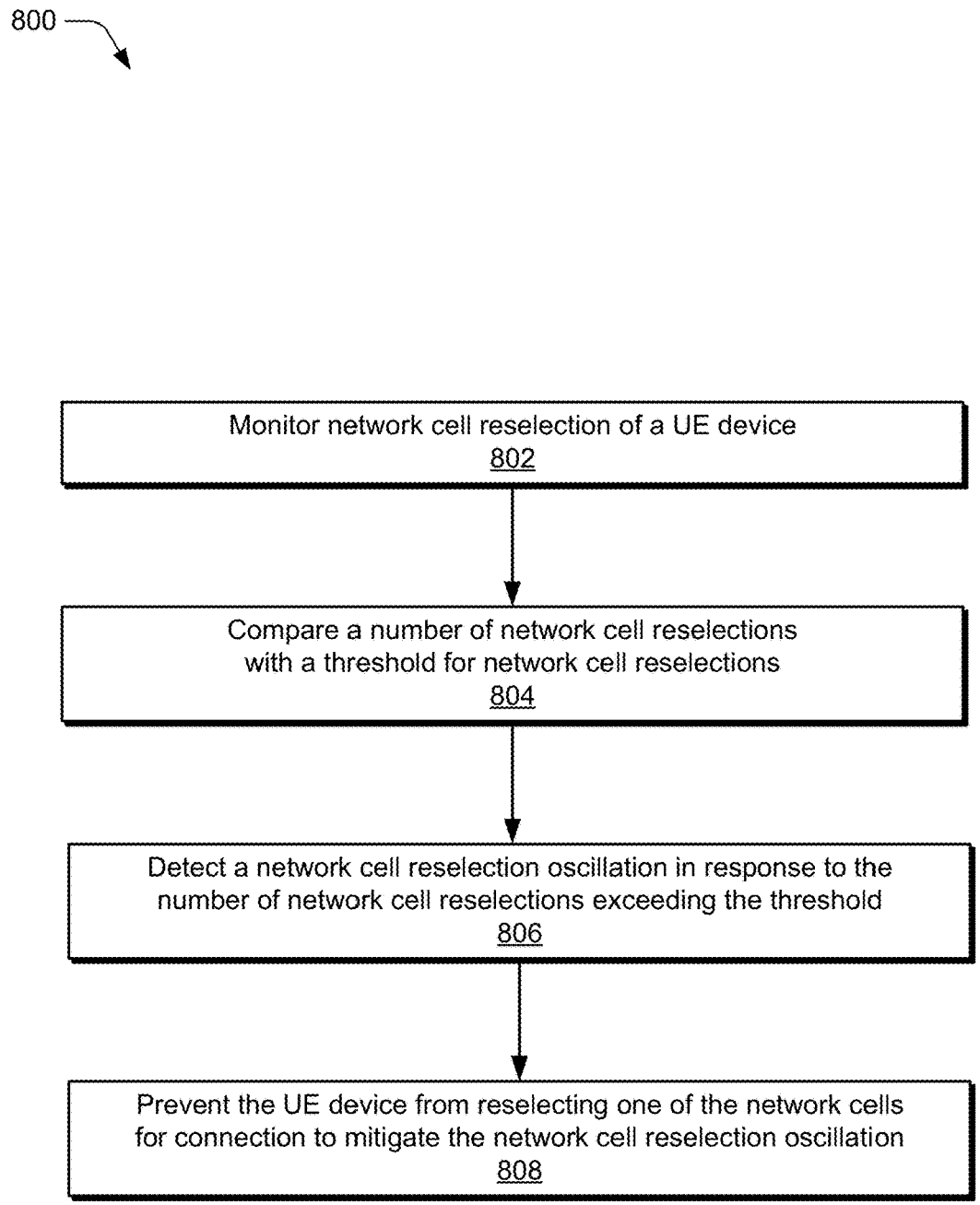
FIG. 8 illustrates an example method of detecting a network cell reselection oscillation between multiple network cells.
Figure 9:
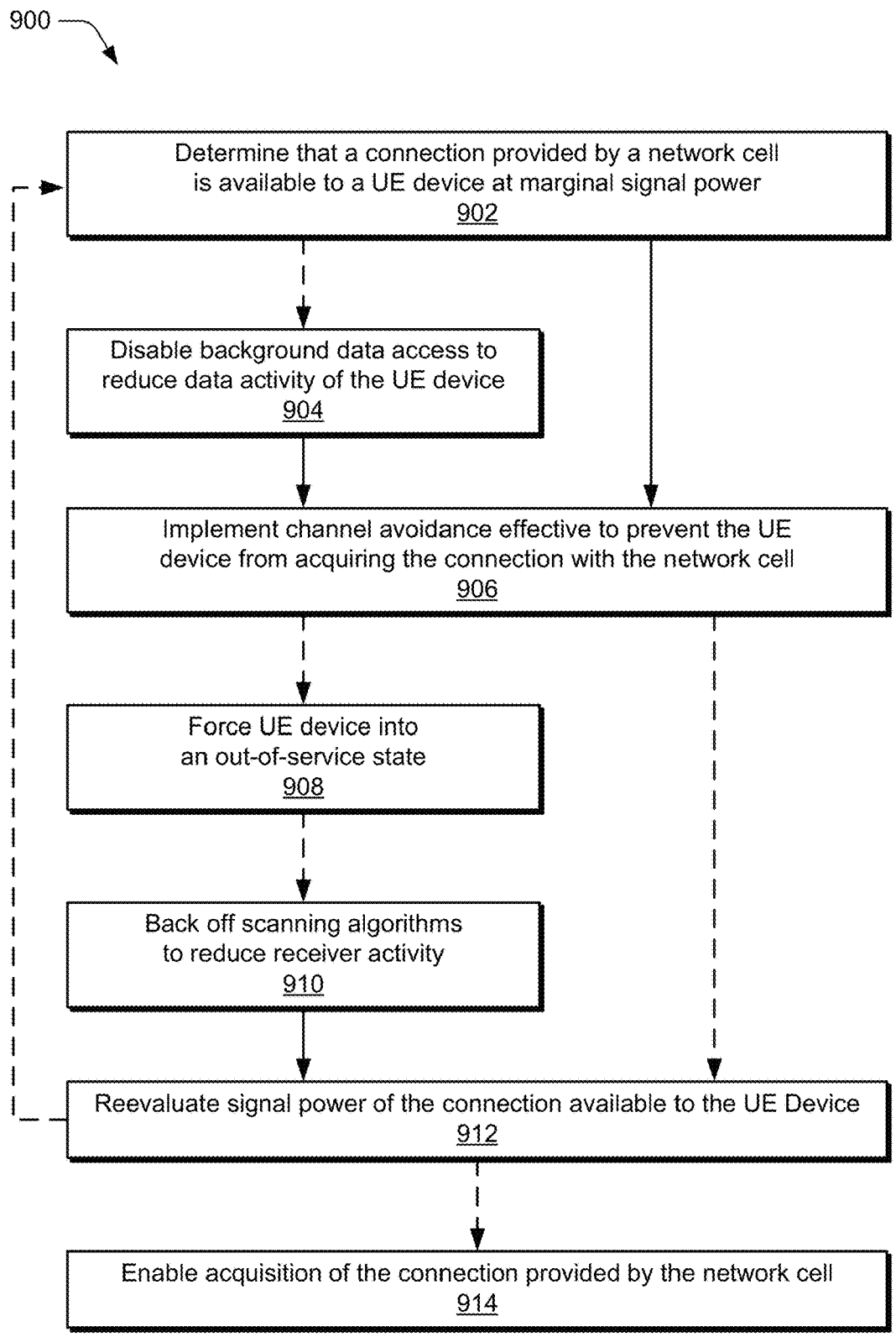
FIG. 9 illustrates an example method for implementing channel avoidance to mitigate effects associated with a marginal network connection.
Figure 10:
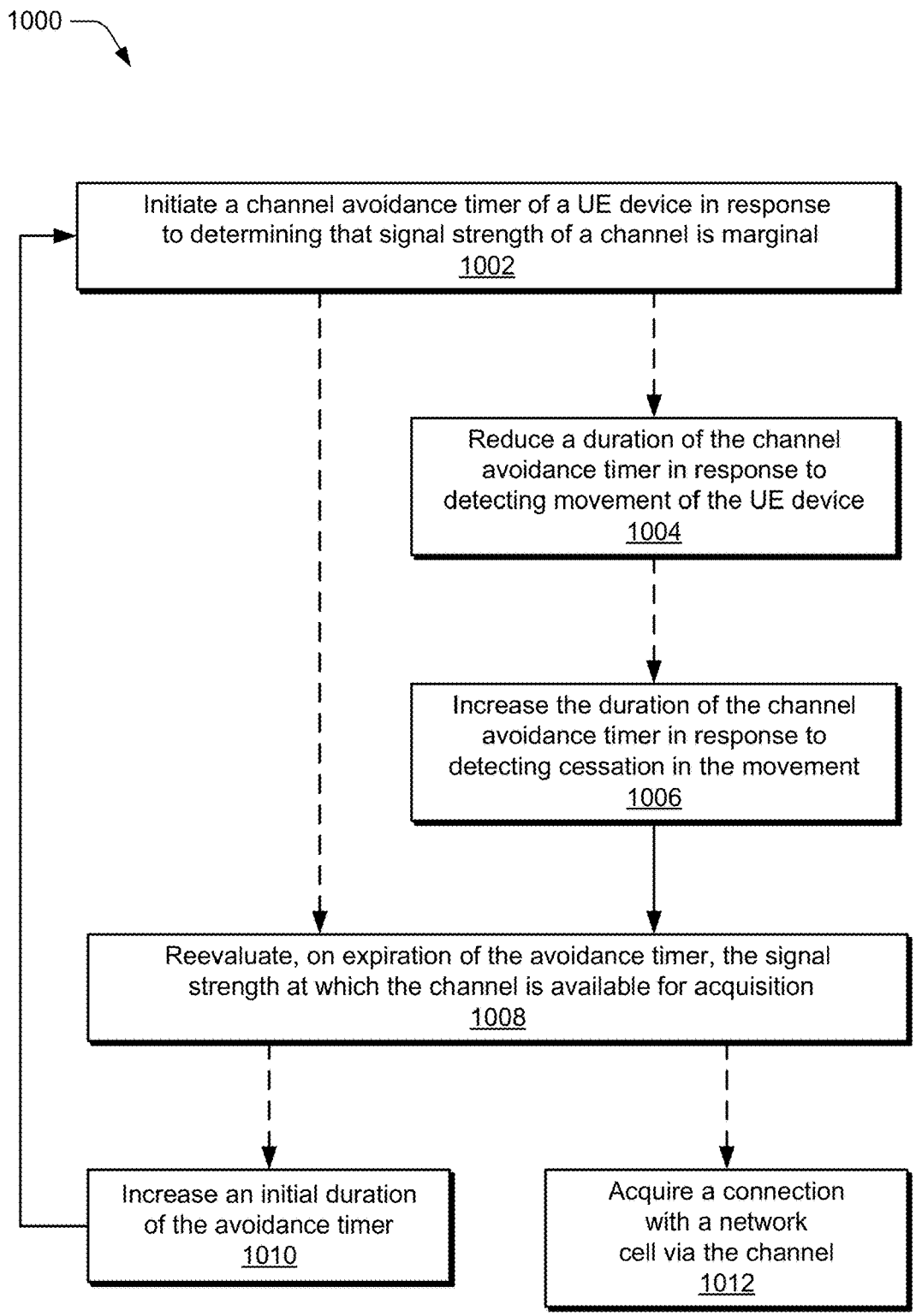
FIG. 10 illustrates an example method of time-based channel avoidance to prevent a user equipment device from acquiring a marginal connection.
Figure 11:
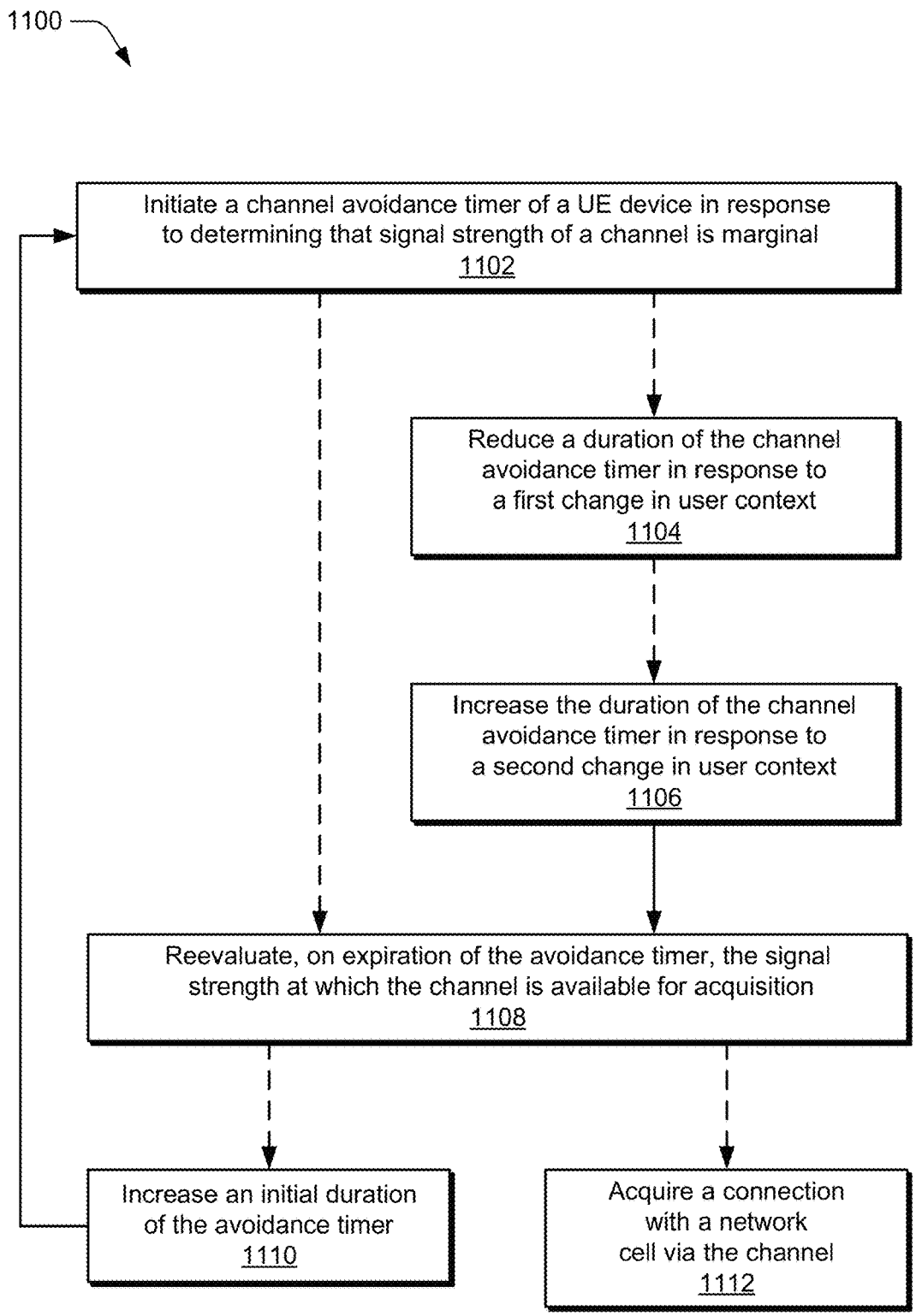
FIG. 11 illustrates another example method of time-based channel avoidance to prevent a user equipment device from acquiring a marginal connection.

FIG. 4 illustrates various components of an example system 400 that can be implemented as any type of UE device 102 as described with reference to FIGS. 1-3 or FIGS. 5-10 to implement adaptive connection management for marginal network conditions. In some aspects, the system 400 is implemented as a component of or embodied on a user equipment device or base station. For example, the system 400 may be implemented as a system of hardware-based components, such as, and without limitation, a Field-Programmable Gate Arrays (FPGA), an Application-Specific Integrated Circuits (ASIC), an Application-Specific Standard Products (ASSP), a System-on-a-Chip systems (SoC), Complex Programmable Logic Devices (CPLD), co-processor, context hub, communication co-processor, sensor co-processors, and the like.

The system 400 includes communication devices 402 that enable wired and/or wireless communication of system data 404 (e.g., device data 226, received data, data that is being received, data scheduled for broadcast, data packets of the data, etc.). The system data 404 or other system content can include configuration settings of the system, media content stored on the device, and/or information associated with a user of the device. Media content stored on the system 400 may include any type of audio, video, and/or image data. The system 400 includes one or more data inputs 406 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

The system 400 also includes communication interfaces 408, which can be implemented as any one or more of a serial and/or parallel interface, a wireless interface, a network interface, a modem, and as any other type of communication interface. Communication interfaces 408 provide a connection and/or communication links between the system 400 and a communication network by which other electronic, computing, and communication devices communicate data with the system 400.

The system 400 includes one or more processors 410 (e.g., any of microprocessors, controllers, and the like), which process various computer-executable instructions to control the operation of the system 400 and to enable techniques for, or in which can be embodied, adaptive connection management for marginal network conditions. Alternately or additionally, the system 400 can be implemented with any one or combination of hardware, firmware, or fixed logic circuitry that is implemented in connection with processing and control circuits, which are generally identified at 412. Although not shown, the system 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The system 400 also includes computer-readable media 414 (CRM 414), such as one or more memory devices that enable persistent and/or non-transitory data storage, and thus do not include transitory signals or carrier waves. Examples of the CRM 414 include random access memory (RAM), non-volatile memory (e.g., any one or more of a read-only memory (ROM), flash memory, EPROM, EEPROM, etc.), or a disk storage device. A disk storage device may be implemented as a magnetic or an optical storage device, such as a hard disk drive, a recordable and/or rewriteable compact disc (CD), any type of a digital versatile disc (DVD), and the like. The system 400 can also include a mass storage media device (storage media) 416 or mass storage device interface. In this example, the system 400 also includes one or more of the sensors 220 as described with reference to FIG. 2.

The computer-readable media 414 provides data storage mechanisms to store the device data 404, as well as various system applications 418 and any other types of information and/or data related to operational aspects of the system 400. For example, an operating system 420 can be maintained as a computer application with the computer-readable media 414, executed on the processors 410. The system applications 418 may include a system manager, such as any form of a control application, software application, signal-processing and control module, code that is native to a particular device, an abstraction module or gesture module and so on. The system applications 418 also include system components and utilities to implement adaptive connection management for marginal network conditions, such as the connection manager 118, signal detection algorithms 232, and mitigation algorithms 234. While not shown, one or more elements of the connection manager 118, communication interfaces 408, or sensors 220 may be implemented, in whole or in part, through hardware or firmware.

Further to the descriptions above, a user may be provided with controls allowing the user to make an election as to both if and when systems, programs, and/or features described herein may enable collection of user information (e.g., received signal strength indicator (RSSI) signals, connection duration information, average connection length, signal quality information, network identity information, network basic service set identifier (BSSID) information, recently utilized wireless communication channels, a user's preferences, a user's current location) and if the user is sent content and/or communications from a server. In addition, certain data may be treated in one or more ways before it is stored or used, so that personally identifiable information is removed. For example, a user's identity may be treated so that no personally identifiable information can be determined for the user. For example, a user's geographic location may be generalized where location information is obtained (such as to a city, postal code, or state/province level), so that a particular location of a user cannot be determined. Thus, the user may have control over what information is collected about the user, how that information is used, and what information is provided to the user.

Example Methods

Example methods 500 through 1100 are described with reference to FIG. 5 through FIG. 11, respectively, in accordance with one or more aspects of adaptive connection management for marginal network conditions. Generally, methods 500 through 1100 illustrate sets of operations (or acts) performed in, but not necessarily limited to, the order or combinations in which the operations are shown herein. Further, any of one or more of the operations may be repeated, combined, reorganized, skipped, or linked to provide a wide array of additional and/or alternate methods. In portions of the following discussion, reference may be made to example wireless network environment 100 of FIG. 1, example devices of FIGS. 2 and 3, example systems of FIG. 4, and/or entities detailed in FIG. 1, reference to which is made for example only. The techniques and apparatuses described in this disclosure are not limited to embodiment or performance by one entity or multiple entities operating on one device.

A UE device, such as UE device 102, described with reference to example methods 500 through 1100 may be implemented as any suitable computing or electronic device, such as a user equipment device, a mobile communication device, a computing device, a client device, a mobile phone, a tablet computer, a laptop computer, a communication device, an entertainment device, a gaming device, a mobile gaming console, a personal media device, a media playback device, a charging station, an ADAS, POS transaction system, a health monitoring device, a drone, a camera, a wearable smart-device, a navigation device, a mobile-internet device MID, an Internet home appliance capable of wireless Internet access and browsing, an Internet-of-Things IoT device, a Fifth Generation New Radio user equipment, and/or other types of user devices.

An access point, such as an access point 106, 108, and/or 110, described with reference to the example methods 500 through 1100 may represent or be implemented as another device, radio access node, wireless communication node, or other suitable piece of equipment that facilitates wireless communication (via a wireless connection) between a user equipment device and a communication network, such as a LAN router, a WLAN router, a WAP in a managed (infrastructure) wireless network, a WiMAX subscriber station, a WiMAX gateway device, a Wi-Fi Direct device, a satellite, a terrestrial television broadcast tower, an access point, a peer-to-peer device, a user equipment device, another smart phone acting as a base station, a broadband router, a user equipment device acting as a base station, a wireless ad hoc network node, and so forth.

Method 500 is a method performed by the UE device 102. The method 500 alters connection parameters of a user equipment device to mitigate effects associated with a marginal network connection. In some aspects, operations of the method 500 are implemented by or with a connection manager 118, signal detection algorithms 232, and/or mitigation algorithms 234 of the user equipment device 102.

At 502, a UE device measures one or more signal-related characteristics of a cellular network. The signal-related characteristics of the cellular network may include a signal strength, a number of radio link failures, or a number of access probes sent to a base station of a network cell. In some cases, a connection manager of the UE device obtains data indicative of the one or more signal-related characteristics from a transceiver of the UE device, which may include or relate to one of signal strength, radio link failure, or access probe transmission.

At 504, the UE device determines that a connection available through a base station of the cellular network is marginal based on the one or more signal-related characteristics. In some cases, a signal strength of the connection is compared to a signal strength threshold based on environmental conditions of the UE device. In other cases, a number of radio link failures is compared with a radio link failure threshold to determine that the connection is marginal. In yet other cases, a number of access probes transmitted (or access probe sequences performed) is compared to an access probe threshold to determine that the connection is marginal. Alternately or additionally, the connection may be determined as available by comparing the signal strength of the connection with a preconfigured threshold for minimum signal strength provided by the cellular network or network management entity.

At 506, the UE device alters connection parameters of the UE device effective to mitigate effects associated with the marginal connection. Altering the connection parameters of the UE device may include reconfiguring data settings or access of the UE device or preventing the UE device from acquiring the connection until the connection is no longer marginal (e.g., improved signal strength or power). Alternately or additionally, the UE device may implement a channel avoidance timer to prevent acquisition of the connection for a duration of time.

Method 600 is a method performed by the UE device 102. The method 600 prevents a user equipment device from connecting to a network cell that is available with marginal signal power. In some aspects, operations of the method 600 are implemented by or with a connection manager 118, signal detection algorithms 232, and/or mitigation algorithms 234 of the user equipment device 102.

At 602, a UE device scans for network cells that are available for connection with the UE device. In some cases, the UE device has previously acquired or is maintaining a connection with a base station of a network cell while the scanning is performed. The current connection of the UE device may be in a non-preferred frequency ban or low priority frequency band of the UE device. Alternately, UE device may not have a current or operation connection with a network cell of a wireless network.

At 604, the UE device detects a network cell that is available for connection with the UE device. The UE device may detect a signal transmitted by a base station of the network cell, with which the UE device is subscribed for service. In some cases, the UE device measures signal power of the connection that is available through the network cell. Alternately or additionally, a connection manager of the UE device may access information related to a number of radio link failures or access probe requests transmitted to the network cell.

At 606, the UE device determines that the connection provided by the network cell is available at marginal signal power. In some cases, a signal strength of the connection is compared to a signal strength threshold based on environmental conditions of the UE device. For example, the signal strength threshold of the UE device may be determined as an offset from a network-provided threshold, where the offset is altered based on the environmental conditions at the UE device. The threshold for marginal signal strength can be determined based on environmental condition that include one or more of a current external temperature at the UE device, an internal temperature of the UE device, humidity, UE device orientation, UE device mobility state, active antenna(s), blocked antenna(s), or the like.

Optionally at 608, the UE device disables background data activity to reduce signaling by the UE device. In some cases, a mitigation algorithm for marginal connections includes disabling or reducing background data activity of the UE device. This can be effective to reduce signaling by the UE device in marginal network conditions and/or when the device is not actively being used to access data.

At 610, the UE device prevents connection with the network cell to conserve power. The UE device may be prevented or barred from acquiring the marginal connection of the network cell for a duration of time, which may be predetermined or set based on other factors associated with the connection. As noted, attempting to connect with a network cell at marginal signal power can significantly increase signaling overhead and power consumption of the UE device. By preventing the UE device from connecting with the network cell, signaling overhead and retransmissions associated communication at marginal signal power are reduced, which in turn conserves power and resources of the user equipment device.

Method 700 is a method performed by a UE device 102. The method 700 determines that an available connection of a network cell is of marginal signal quality. In some aspects, operations of the method 700 are implemented by or with a connection manager 118, signal detection algorithms 232, and/or mitigation algorithms 234 of the user equipment device 102.

At 702, a UE device measures signal strength of a network cell available to the UE device for connection. The connection may be offered or solicited by a base station of the network cell. In some cases, the signal strength of the network cell may be measured in accordance with an algorithm to determine whether the connection with a network cell would be of marginal signal strength.

At 704, the UE device compares the signal strength of the network cell to a signal strength threshold. The signal strength threshold can be offset from a minimum signal strength parameter provided by a cellular network to which the network cell belongs. Alternately or additionally, the signal strength threshold can be determined or set based on environmental factors at the UE device or respective propagation properties of a particular frequency band and access technology. From operation 704, the method 700 may proceed to operation 706 in response to the signal strength being less than the signal strength threshold or continue to operation 708.

At 706, the UE device determines that the connection of the network cell is of marginal signal quality. In response to determining that the connection is of marginal signal quality, the UE device may implement mitigation operation to conserve power and signaling resources until a connection with another network cell is acquired or signal quality of the connection of the instant network cell improves.

At 708, the UE device monitors radio link failures associated with the network cell. The UE device may monitor the connection for a radio link failure, count a number of radio link failures with the connection, or access data related to previous radio link failures associated with the instant network cell. In some cases, a radio link failure occurs while attempting to negotiate connection with the network cell.

At 710, the UE device compares a number of the radio link failures to a radio link failure threshold. The radio link failure threshold may be a default value (e.g., three RFLs) or configured based on environmental conditions at the UE device. In some cases, a duration of time is associated with the radio link failure threshold such that a number of radio link failures that occur during the duration of time are compared with the radio link failure threshold. From operation 710, the method 700 may proceed to operation 706 in response to the number of radio link failures exceeding the radio link failure threshold or continue to operation 712.

At 712, the UE device monitors access probes sent to the network cell. The UE device may monitor a number of access probes sent to the network cell or a number of access probe sequences performed in which multiple access probes are transmitted to the network cell. Typically, a maximum of 16 access probes are transmitted as part of a sequence, with a maximum of 15 sequences being transmitted by the UE device. At the maximum number of access probes or access probe sequences, the UE device may exit the access probe process. Alternately or additionally, the UE device may monitor or count a number of access probe exits that are associated with the network cell.

At 714, the UE device compares a number of access probes sent without success to an access probe threshold. The access probe threshold can be a default value or configured based on environmental conditions at the UE device, examples of which are described throughout the disclosure. Alternately or additionally, the number of access probe sequences (e.g., unsuccessful sequences) can be compared to the access probe threshold. From operation 714, the method 700 may proceed to operation 706 in response to the number of access probes sent without success exceeding the access probe threshold (marginal signal quality) or return to operation 702, such as to perform another iteration of the method 700.

Method 800 is a method performed by a UE device 102. The method 800 detects a network cell reselection oscillation between multiple network cells. In some aspects, operations of the method 800 are implemented by or with a connection manager 118, signal detection algorithms 232, and/or mitigation algorithms 234 of the user equipment device 102.

At 802, a UE device monitors cell network reselection of the UE device. The UE device may monitor a number of cell network reselections for a duration of time or over respective intervals of time. In some cases, a network cell with strong signal strength or good signal quality is available but not in a preferred or high priority frequency band of the UE device. The UE device may reselect to a network cell with a marginal signal strength or marginal signal quality, causing a number of reselections between the two network cells. Alternately or additionally, the UE device 102 can oscillates or "ping-pong" between two connections of similar, yet marginal signal strength.

At 804, the UE device compares a number of network cell reselections with a threshold for network cell reselections. As noted, the UE device may count and compare a number of cell reselections that occur during a particular duration of time. The threshold for network cell reselections may be a default value or adjusted based on environmental conditions at the user device.

At 806, the UE device detects a network cell reselection oscillation in response to the number of network cell reselections exceeding the threshold. When a number of cell network reselections exceeds the network cell reselection threshold, the UE device is determined to be excessively entering a reselection mode. As noted, the reselection oscillation or "ping-ponging" of the UE device between network cells can be caused by the availability of the network cell having higher priority yet marginal signal or multiple network cells with marginal signals that vary over time.

At 808, the UE device prevents reselection of one of the network cells for connection to mitigate the network cell reselection oscillation. The UE device may be prevented or barred from acquiring one or both of marginal network cells associated with the reselection oscillation. In some cases, an avoidance timer can be used to prevent the UE device from attempting to connect with the marginal network cell. By preventing the UE device from reselecting a marginal network cell, signaling overhead and retransmissions can be reduced, which in turn conserves power and resources of the UE equipment device.

Method 900 is a method performed by a UE device 102. The method 900 implements channel avoidance to mitigate effects associated with a marginal network connection. In some aspects, operations of the method 900 are implemented by or with a connection manager 118, signal detection algorithms 232, and/or mitigation algorithms 234 of the UE device 102.

At 902, the UE device determines that a connection provided by a network cell is available at marginal signal power. In some cases, a signal strength of the connection is compared to a signal strength threshold based on environmental conditions of the UE device. Alternately or additionally, a number of radio link failures is compared with a radio link failure threshold to determine that the connection is marginal. In other cases, a number of access probes transmitted (or access probe sequences performed) is compared to an access probe threshold to determine that the connection is marginal.

Optionally at 904, the UE device disables background data access to reduce data activity of the UE device. In some cases, a mitigation algorithm for marginal connections includes disabling or reducing background data activity of the UE device. This can be effective to reduce signaling by the UE device in marginal network conditions and/or when the device is not actively being used to access data.

At 906, the UE device implements channel avoidance effective to prevent the UE device from acquiring the connection with the network cell. The channel avoidance (or connection avoidance) may include the use of an avoidance timer to prevent or bar the UE device from acquiring the marginal connection for a predefined amount of time. In some cases, a duration of the avoidance timer is altered based on a mobility state of the UE device, a subsequent signal strength measurement, a number of previous iterations of the avoidance timer, or the like. From the channel avoidance operation of 906, the method 900 can proceed to operation 908 and/or operation 910, such as when other network cells are not available. Alternately, the method 900 may proceed from operation 906 directly to operation 912, which enables the UE device to scan for other available network cells while implementing channel avoidance.

Optionally at 908, the UE device can be forced into an out-of-service state. In some cases, the UE device is forced into an out-of-service state by a connection manager while an avoidance timer is active. When another network cell is not available, forcing the UE device into an out-of-service state can further increase power conservation at the UE device.

Optionally at 910, the UE device backs off scanning algorithms while in the out-of-service state to reduce receiver activity of the UE device. While in the out-of-state service, the UE device may scan for other available network cells. In some cases, such as when the UE device is stationary, excessive scanning by the receiver can lead to additional power draw. As such, the connection manager may reduce or back off a frequency at which the receiver of the UE device scans for available networks to conserve additional power.

At 912, the UE device reevaluates the signal power of the connection available to the UE device from the network cell. In addition to reevaluating the signal power of the connection, the UE device may also reevaluate radio link failures or access probe transmissions to the network cell. By comparing one or more of these metrics with a respective threshold, the UE device can determine if the signal power (or signal quality) of the connection has improved or if the connection remains in a marginal state. From operation 912, the method 900 can proceed to operation 914 or return to operation 902, such as to perform another iteration of the method 900.

At 914, the UE device enables acquisition of the connection provided by the network cell. In response to determining that the signal power of the connection has sufficiently improved, the connection manager enables the UE device to acquire the connection with the network cell. By preventing or delaying acquisition of the connection with the network cell, signaling overhead of and retransmissions by the UE device can be reduced, thereby conserving power.

Method 1000 is a method performed by a UE device 102. The method 1000 uses time-based channel avoidance to prevent the UE device from acquiring a marginal connection. In some aspects, operations of the method 1000 are implemented by or with a connection manager 118, signal detection algorithms 232, and/or mitigation algorithms 234 of the UE device 102.

At 1002, the UE device initiates a channel avoidance timer in response to determining that signal strength of a channel is marginal. In some cases, a signal strength of the connection is compared to a signal strength threshold based on environmental conditions of the UE device. The avoidance timer may be configured to prevent or bar the UE device 102 from acquiring a connection over a marginal channel for a predefined amount of time. From operation 1002, the method 1000 may proceed to operation 1004 and/or operation 1006, such as when the UE device changes mobility state. Alternately, the method 1000 may proceed from operation 1002 directly to operation 1008. For example, the method 100 may advance to operation 1008 based on the mobility state of the UE device being static or remaining unchanged during channel avoidance.

Optionally at 1004, the UE device reduces a duration of the channel avoidance timer in response to detecting movement of the UE device. When the UE device transitions from a stationary state to a mobile state, the duration of the avoidance timer can be reduced, such as to aid in reacquisition of a connection if network conditions have improved. Alternately or additionally, movement of the UE device may also trigger a reevaluation of signal strength of the channel to determine if signal strength of the channel has improved.

Optionally at 1006, the UE device increases the duration of the channel avoidance timer in response to detecting cessation in movement of the UE device. When the UE device transitions from a mobility state to a stationary state, the connection manager can increase or restore a duration of the avoidance timer to a default value. In some cases, the avoidance timer is reset if, on a change in mobility state, signal strength of the connection has not improved (e.g., by 3 dBm to 5 dBm over a previous measurement).

At 1008, the UE device reevaluates, on expiration of the avoidance timer, the signal strength at which the channel is available for acquisition. In addition to reevaluating the signal power of the channel, the UE device may also reevaluate radio link failures or access probe transmissions to the network cell. By comparing one or more of these metrics with a respective threshold, the UE device can determine if the signal power (or signal quality) of the channel has improved or if the connection remains in a marginal state. From and based on the result of operation 1008, the method 1000 can proceed to operation 1010 or to operation 1012.

Optionally at 1010, the UE device increases an initial duration of the channel avoidance timer. In cases in which signal strength does not improve after expiration of the avoidance timer, the default or previous duration of the avoidance timer can be increased to avoid the connection for a longer duration of time, thereby conserving additional power at the UE device 102. From operation 1010, the method 1000 may return to operation 1002 to initiate another iteration of the method 1000 with the increased duration of the avoidance timer.

Optionally at 1012, the UE device acquires a connection with the network cell via the channel. The UE device can acquire the connection if signal strength of the channel improves sufficiently to support the connection with the network cell. By preventing or delaying acquisition of the connection with the network cell, signaling overhead of and retransmissions by the UE device can be reduced, thereby conserving power.

Method 1100 is a method performed by a UE device 102. The method 1100 uses time-based channel avoidance to prevent the UE device from acquiring a marginal connection. In some aspects, operations of the method 1100 are implemented by or with a connection manager 118, signal detection algorithms 232, and/or mitigation algorithms 234 of the UE device 102.

At 1102, the UE device initiates a channel avoidance timer in response to determining that signal strength of a channel is marginal. In some cases, a signal strength of the connection is compared to a signal strength threshold based on environmental conditions of the UE device. The avoidance timer may be configured to prevent or bar the UE device 102 from acquiring a connection over a marginal channel for a predefined amount of time. From operation 1102, the method 1100 may proceed to operation 1104 and/or operation 1106, such as based on or responsive to detecting a change in user context information. Alternately, the method 1100 may proceed from operation 1102 directly to operation 1108. For example, the method 110 may advance to operation 1108 based on the user context information being static or remaining unchanged during channel avoidance.

Optionally at 1104, the UE device reduces a duration of the channel avoidance timer in response to detecting a first change in user context or user context information. For example, when a change in user context information associated with a mobility state, orientation, relative user proximity (e.g., finger/grip position), UE device activity, UE device access, or the like changes or updates, the duration of the avoidance timer can be reduced, such as to aid in reacquisition of a connection if network conditions have improved. Alternately or additionally, movement of the UE device may also trigger a reevaluation of signal strength of the channel to determine if signal strength of the channel has improved.

Optionally at 1106, the UE device increases the duration of the channel avoidance timer in response to detecting a second change in user context or user context information. For example, when another change in user context information associated with the mobility state, orientation, relative user proximity (e.g., finger/grip position), UE device activity, UE device access, or the like changes or updates, the connection manager can increase or restore a duration of the avoidance timer to a default value. In some cases, the avoidance timer is reset if, on a change in mobility state or user activity, signal strength of the connection has not improved (e.g., by 3 dBm to 5 dBm over a previous measurement).

At 1108, the UE device reevaluates, on expiration of the avoidance timer, the signal strength at which the channel is available for acquisition. In addition to reevaluating the signal power of the channel, the UE device may also reevaluate radio link failures, access probe transmissions to the network cell, or other changes in user context information. By comparing one or more of these metrics with a respective threshold, the UE device can determine if the signal power (or signal quality) of the channel has improved or if the connection remains in a marginal state. From and based on the result of operation 1108, the method 1100 can proceed to operation 1110 or to operation 1112.

Optionally at 1110, the UE device increases an initial duration of the channel avoidance timer. In cases in which signal strength does not improve after expiration of the avoidance timer or changes in the user context, the default or previous duration of the avoidance timer can be increased to avoid the connection for a longer duration of time, thereby conserving additional power at the UE device 102. From operation 1110, the method 1100 may return to operation 1102 to initiate another iteration of the method 1100 with the increased duration of the avoidance timer.

Optionally at 1112, the UE device acquires a connection with the network cell via the channel. The UE device can acquire the connection if signal strength of the channel improves sufficiently to support the connection with the network cell. By preventing or delaying acquisition of the connection with the network cell, signaling overhead of and retransmissions by the UE device can be reduced, thereby conserving power.

Variations

Although the above-described systems and methods are described in the context of adaptive connection management for marginal conditions in a wireless network in which one or more base stations are accessible, the described systems and methods are non-limiting and may apply to other contexts, user equipment deployments, or wireless-communication environments.

Generally, the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, FPGAs, ASICs, ASSPs, SoCs, CPLDs, co-processors, context hubs, motion co-processors, sensor co-processors, and the like.

A first method for performed by a user equipment device comprises measuring, at the user equipment device, one or more signal-related characteristics of a cellular network, the one or more signal-related characteristics including signal strength of a connection available through a base station of the cellular network; determining, based on the signal strength, that the connection available through the base station is eligible for acquisition by the user equipment device; determining, based on the one or more signal-related characteristics, that the connection available through the base station of the cellular network is marginal; and altering, in response to determining that the connection available through the base station is marginal, connection parameters of the user equipment device effective to mitigate effects associated with the marginal connection.

In addition to the above described first method, a second method performed by a user equipment device comprises maintaining, at the user equipment device, a first connection with a first base station of a cellular network; monitoring, at the user equipment device, one or more signal-related characteristics of a second connection available through a second base station of the cellular network, the one or more signal-related characteristics including signal strength of the second connection; determining, based on the signal strength of the second connection, that the connection available through the second base station is eligible for acquisition by the user equipment device; determining, based on the one or more signal-related characteristics, that the second connection available through the second base station of the cellular network is marginal; and altering, in response to determining that the second connection available through the second base station is marginal, connection parameters of the user equipment device effective to prevent the user equipment device from transitioning from the first connection to the second connection.

In addition to the above described methods, a user equipment (UE) device comprises a transceiver operably coupled with one or more antennas; a hardware-based processor associated with the transceiver; and computer-readable storage media storing instructions to implement a connection manager for cellular networks. The connection manager is configured to direct the user equipment device to: measure, via the transceiver, one or more signal-related characteristics of a cellular network, the one or more signal-related characteristics including signal strength of a connection available through a base station of the cellular network; determine, based on the signal strength, that the connection available through the base station is eligible for acquisition by the user equipment device; determine, based on the one or more signal-related characteristics, that the connection available through the base station of the cellular network is marginal; and alter, in response to the determination that the connection is marginal, connection parameters of the user equipment device effective to mitigate effects associated with the marginal connection.

In addition to any of the first method, the second method, or the UE device described above, the one or more signal-related characteristics comprise a non-signal strength characteristic, and wherein determining that the connection is marginal is based on the non-signal strength characteristic.

In addition to any of the first method, the second method, or the UE device described above, altering the connection parameters of the user equipment device comprises disabling background data activity of the user equipment device to reduce cellular-network-related signaling by the user equipment device.

In addition to any of the first method, the second method, or the UE device described above, altering the connection parameters of the user equipment device comprises preventing the user equipment device from acquiring the marginal connection.

In addition to any of the first method, the second method, or the UE device described above, preventing the user equipment device from acquiring the connection available through the base station includes forcing the user equipment device into an out-of-service state.

In addition to any of the first method, the second method, or the UE device described above, altering the connection parameters of the user equipment device includes implementing a channel avoidance algorithm that prevents the user equipment device from acquiring the connection for a duration of time.

In addition to any of the first method, the second method, or the UE device described above, the operations further comprise detecting a change in a mobility state of the user equipment device; and altering, based on the change in the mobility state, the duration of time for which the channel avoidance algorithm prevents the user equipment device from acquiring the connection available through the base station.

In addition to any of the first method, the second method, or the UE device described above, determining that the connection available through the base station is eligible for acquisition by the user equipment device comprises comparing the signal strength of the connection to a first threshold; and determining that the connection available through the base station of the cellular network is marginal includes comparing the signal strength of the connection to a second threshold.

In addition to any of the first method, the second method, or the UE device described above, the operations further comprise receiving, by the user equipment device, an indication of the first threshold from a management entity of the cellular network; and determining, by the user equipment device, the second threshold by applying an offset to the first threshold.

In addition to any of the first method, the second method, or the UE device described above, the operations further comprise determining that the connection available through the base station is eligible for acquisition by the user equipment device includes comparing the signal strength of the connection to a first threshold; and determining that the connection available through the base station of the cellular network is marginal includes comparing the signal strength of the connection to a second threshold.

In addition to any of the first method, the second method, or the UE device described above, the one or more signal-related characteristics include an indication of a number of radio link failures associated with the connection available through the base station; and the operations further comprise determining that the connection available through the base station of the cellular network is marginal includes comparing the number of the radio link failures with a radio-link-failure threshold; or the one or more signal-related characteristics include an indication of a number of access probes transmitted by the user equipment device to the base station through which the connection is available; and determining that the connection available through the base station of the cellular network is marginal includes comparing the number of the access probes transmitted by the user equipment device with an access-probe-transmission threshold.

Although aspects of adaptive connection management for marginal network conditions have been described in language specific to features and/or methods, the subject of the appended claims is not necessarily limited to the specific features or methods described. Rather, the specific features and methods are disclosed as example implementations of adaptive connection management for marginal network conditions and other equivalent features and methods are intended to be within the scope of the appended claims. Further, various different aspects are described, and it is to be appreciated that each described aspect can be implemented independently or in connection with other described aspects.

In the following, some examples are described:

Example 1: A method performed by a user equipment device, the method comprising:

measuring, at the user equipment device, one or more signal-related characteristics of a cellular network, the one or more signal-related characteristics including signal strength of a connection available through a base station of the cellular network;

determining, based on the signal strength, that the connection available through the base station is eligible for acquisition by the user equipment device;

determining, based on the one or more signal-related characteristics, that the connection available through the base station of the cellular network is marginal; and altering, in response to determining that the connection available through the base station is marginal, connection parameters of the user equipment device effective to mitigate effects associated with the marginal connection.

Example 2: The method of example 1, wherein the one or more signal-related characteristics includes a non-signal strength characteristic, and wherein determining that the connection is marginal is based on the non-signal strength characteristic.

Example 3: The method of example 1 or 2, wherein altering the connection parameters of the user equipment device includes disabling background data activity of the user equipment device to reduce cellular-network-related signaling by the user equipment device.

Example 4: The method of example 1 or 2, wherein altering the connection parameters of the user equipment device includes preventing the user equipment device from acquiring the marginal connection.

Example 5: The method of at least one of the preceding examples, wherein preventing the user equipment device from acquiring the connection available through the base station includes forcing the user equipment device into an out-of-service state.

Example 6: The method of at least one of the preceding examples, wherein altering the connection parameters of the user equipment device includes implementing a channel avoidance algorithm that prevents the user equipment device from acquiring the connection for a duration of time.

Example 7: The method of at least one of the preceding examples, further comprising:

detecting a change in a mobility state of the user equipment device; and altering, based on the change in the mobility state, the duration of time for which the channel avoidance algorithm prevents the user equipment device from acquiring the connection available through the base station.

Example 8: The method of at least one of the examples 3 to 7, wherein:

determining that the connection available through the base station is eligible for acquisition by the user equipment device includes comparing the signal strength of the connection to a first threshold; and determining that the connection available through the base station of the cellular network is marginal includes comparing the signal strength of the connection to a second threshold.

Example 9: The method of example 8, further comprising:

receiving, by the user equipment device, an indication of the first threshold from a management entity of the cellular network; and determining, by the user equipment device, the second threshold by applying an offset to the first threshold.

Example 10. The method of at least one of the examples 3 to 12, wherein the connection available through the base station of the cellular network is marginal having a signal strength between a first threshold and a second threshold, in particular an offset between the first threshold and the second threshold being at least 3 decibel-milliwatts (dBm).

Example 11: The method of at least one of the preceding examples, wherein:

the one or more signal-related characteristics include an indication of a number of radio link failures associated with the connection available through the base station; and determining that the connection available through the base station of the cellular network is marginal includes comparing the number of the radio link failures with a radio-link-failure threshold; or the one or more signal-related characteristics include an indication of a number of access probes transmitted by the user equipment device to the base station through which the connection is available; and determining that the connection available through the base station of the cellular network is marginal includes comparing the number of the access probes transmitted by the user equipment device with an access-probe-transmission threshold.

Example 12: A method performed by a user equipment device, the method comprising:

maintaining, at the user equipment device, a first connection with a first base station of a cellular network;

monitoring, at the user equipment device, one or more signal-related characteristics of a second connection available through a second base station of the cellular network, the one or more signal-related characteristics including signal strength of the second connection;

determining, based on the signal strength of the second connection, that the connection available through the second base station is eligible for acquisition by the user equipment device;

determining, based on the one or more signal-related characteristics, that the second connection available through the second base station of the cellular network is marginal; and altering, in response to determining that the second connection available through the second base station is marginal, connection parameters of the user equipment device effective to prevent the user equipment device from transitioning from the first connection to the second connection.

Example 13: The method of example 12, wherein:

the first connection with the first base station is in a frequency band of a first priority rank;

the second connection available through the second base station is in a second frequency band of a second priority rank, the second priority rank of the second frequency band being higher than the first priority rank of the first frequency band; and altering the connection parameters of the user equipment device is effective to prevent acquisition of the second connection in the second frequency band.

Example 14: The method of example 12 or 13, further comprising measuring a signal strength of the first connection with the first base station and wherein:

the signal strength of the second connection available is lower than the signal strength of the first connection; and altering the connection altering the connection parameters of the user equipment device is effective to prevent acquisition of the second connection with the lower signal strength in the second frequency band that is of higher priority rank than the first frequency band.

Example 15: The method of at least one of the examples 12 to 14, further comprising determining, based on the one or more signal-related characteristics, that the first connection with the first base station is marginal and wherein altering the connection parameters is effective to prevent the user equipment from transitioning the first marginal connection to the second marginal connection.

Example 16: The method of at least one of the examples 12 to 15, wherein:

the one or more signal-related characteristics of the second connection include a number of reselections performed by the user equipment to the second connection; and the second connection available through the second base station is determined to be marginal based on the number of reselections made over a duration of time.

Example 17: The method of at least one of the examples 12 to 16, wherein the first connection with the first base station or the second connection available through the second base station of the cellular network is marginal, having a signal strength between a first threshold and a second threshold.

Example 18: User equipment device comprising:

a transceiver operably coupled with one or more antennas;

a hardware-based processor associated with the transceiver; and computer-readable storage media storing instructions to implement a connection manager for cellular networks, the connection manager configured to direct the user equipment device to:

measure, via the transceiver, one or more signal-related characteristics of a cellular network, the one or more signal-related characteristics including signal strength of a connection available through a base station of the cellular network;

determine, based on the signal strength, that the connection available through the base station is eligible for acquisition by the user equipment device;

determine, based on the one or more signal-related characteristics, that the connection available through the base station of the cellular network is marginal; and alter, in response to the determination that the connection is marginal, connection parameters of the user equipment device effective to mitigate effects associated with the marginal connection.

Example 19: The user equipment of example 18, wherein to alter the connection parameters of the user equipment device the connection manager is further configured to disable background data activity of the user equipment device, the disabling of the background data activity effective to reduce cellular network related-signaling by the user equipment device.

Example 20: The user equipment of example 18 or 19, wherein to alter the connection parameters of the user equipment device, the connection manager is further configured to prevent the user equipment device from acquiring the marginal connection.

Example 21: The user equipment of at least one of the examples 18 to 20, wherein the connection manager is further configured to direct the user equipment device to:

compare the signal strength of the connection to a first threshold in order to determine that the connection available through the base station is eligible for acquisition; and compare the signal strength of the connection to a second threshold in order to determine that the connection available through the base station of the cellular network is marginal.

Example 22: The user equipment of at least one of the examples 18 to 21, wherein the connection manager is further configured to direct the user equipment device to:

monitor, as one of the one or more signal-related characteristics, a number of radio link failures associated with the connection available through the base station; and compare the number of the radio link failures with a radio-link-failure threshold to determine that the connection available through the base station of the cellular network is marginal; or monitor, as one of the one or more signal-related characteristics, a number of access probes transmitted by the user equipment device to the base station through which the connection is available; and compare the number of the access probes transmitted by the user equipment device with an access-probe-transmission threshold to determine that the connection available through the base station of the cellular network is marginal.

Example 23: The user equipment of at least one of the examples 18 to 22, wherein the connection available through the base station of the cellular network is marginal, having a signal strength between a first threshold and a second threshold.

What is claimed is:

1. A method performed by a user equipment device, the method comprising:
    measuring, at the user equipment device, one or more signal-related characteristics of a cellular network, the one or more signal-related characteristics including a signal strength of a connection available through a base station of the cellular network;
    determining, based on the measured signal strength of the connection available through the base station of the cellular network, that the connection available through the base station is eligible for acquisition by the user equipment device;
    determining, based on the one or more signal-related characteristics, that the connection available through the base station of the cellular network is marginal; and
    altering, in response to determining that the connection available through the base station is marginal, connection parameters of the user equipment device effective to mitigate effects associated with the marginal connection, the altering of the connection parameters of the user equipment device comprising:
        initiating an avoidance timer having a duration;
        detecting a change in a motion state of the user equipment device;
        when the motion state changes from a state of no movement to a state of movement, reducing the duration of the avoidance timer;
        when the motion state changes from a state of movement to a state of no movement, increasing the duration of the avoidance timer; and
        barring acquisition of the connection available through the base station for the duration of the avoidance timer.

2. The method of claim 1,
    wherein the one or more signal-related characteristics includes a non-signal strength characteristic, and
    wherein determining that the connection is marginal is based on the non-signal strength characteristic.

3. The method of claim 1, wherein altering the connection parameters of the user equipment device includes disabling background data activity of the user equipment device to reduce cellular-network-related signaling by the user equipment device.

4. The method of claim 1, wherein:
    determining that the connection available through the base station is eligible for acquisition by the user equipment device includes comparing the signal strength of the connection to a first threshold; and
    determining that the connection available through the base station of the cellular network is marginal includes comparing the signal strength of the connection to a second threshold.

5. The method of claim 4, further comprising:
    receiving, by the user equipment device, an indication of the first threshold from a management entity of the cellular network; and
    determining, by the user equipment device, the second threshold by applying an offset to the first threshold.

6. The method of claim 1,
    wherein the one or more signal-related characteristics include an indication of a number of radio link failures associated with the connection available through the base station,
    the method further comprising:
        determining that the connection available through the base station of the cellular network is marginal includes comparing the number of the radio link failures with a radio-link-failure threshold.

7. The method of claim 1,
    wherein the one or more signal-related characteristics include an indication of a number of access probes transmitted by the user equipment device to the base station through which the connection is available,
    the method further comprising:
        determining that the connection available through the base station of the cellular network is marginal includes comparing the number of the access probes transmitted by the user equipment device with an access-probe-transmission threshold.

8. The method of claim 1, wherein determining that the connection available through the base station is eligible for acquisition by the user equipment device further comprises:
    comparing, by the user equipment device, the measured signal strength of the connection available through the base station of the cellular network to a signal strength threshold for acquiring a connection with the base station of the cellular network.

9. The method of claim 8, wherein determining that the connection available through the base station is eligible for acquisition by the user equipment device further comprises:
    receiving, by the user equipment device from a management entity of the cellular network, the signal strength threshold.

10. The method of claim 8, wherein determining that the connection available through the base station is eligible for acquisition by the user equipment device further comprises:
    applying an offset to the signal strength threshold.

11. The method of claim 1, wherein altering the connection parameters of the user equipment device further comprises:
    preventing the user equipment device from acquiring the connection available through the base station of the cellular network by forcing the user equipment device into an out-of-service state.

12. The method of claim 11, wherein altering the connection parameters of the user equipment device further comprises:
    reducing a frequency at which a receiver of the user equipment device scans for available networks while the user equipment device is in the out-of-service state.

13. A user equipment device comprising:
    a transceiver operably coupled with one or more antennas;
    a hardware-based processor associated with the transceiver; and
    computer-readable storage media storing instructions to implement a connection manager for cellular networks, the connection manager configured to direct the user equipment device to:
        measure, via the transceiver, one or more signal-related characteristics of a cellular network, the one or more signal-related characteristics including a signal strength of a connection available through a base station of the cellular network;
        determine, based on the measured signal strength of the connection available through the base station of the cellular network, that the connection available through the base station is eligible for acquisition by the user equipment device;

determine, based on the one or more signal-related characteristics, that the connection available through the base station of the cellular network is marginal; and alter, in response to the determination that the connection is marginal, connection parameters of the user equipment device effective to mitigate effects associated with the marginal connection, the alteration of the connection parameters of the user equipment device comprising the connection manager configured to further direct the user equipment device to:
  initiate an avoidance timer having a duration;
  detect a change in a motion state of the user equipment device;
  when the motion state changes from a state of no movement to a state of movement, reduce the duration of the avoidance timer;
  when the motion state changes from a state of movement to a state of no movement, increase the duration of the avoidance timer; and
  bar acquisition of the connection available through the base station for the duration of the avoidance timer.

14. The user equipment device of claim 13, wherein to alter the connection parameters of the user equipment device the connection manager is further configured to disable background data activity of the user equipment device, the disabling of the background data activity effective to reduce cellular network related-signaling by the user equipment device.

15. The user equipment device of claim 13, wherein the connection manager is further configured to direct the user equipment device to:

compare the signal strength of the connection to a first threshold in order to determine that the connection available through the base station is eligible for acquisition; and compare the signal strength of the connection to a second threshold in order to determine that the connection available through the base station of the cellular network is marginal.

16. The user equipment device of claim 13, wherein the connection manager is further configured to direct the user equipment device to:

monitor, as one of the one or more signal-related characteristics, a number of radio link failures associated with the connection available through the base station; and compare the number of the radio link failures with a radio-link-failure threshold to determine that the connection available through the base station of the cellular network is marginal; or monitor, as one of the one or more signal-related characteristics, a number of access probes transmitted by the user equipment device to the base station through which the connection is available; and compare the number of the access probes transmitted by the user equipment device with an access-probe-transmission threshold to determine that the connection available through the base station of the cellular network is marginal.

17. The user equipment device of claim 13, wherein the determination that the connection available through the base station is eligible for acquisition by the user equipment device comprises the connection manager further configured to direct the user equipment device to:

compare, by the user equipment device, the measured signal strength of the connection available through the base station of the cellular network to a signal strength threshold for acquiring a connection with the base station of the cellular network.

\* \* \* \* \*